United States Patent
Lee et al.

(10) Patent No.: US 10,707,773 B2
(45) Date of Patent: Jul. 7, 2020

(54) ENERGY ACQUISITION AND POWER SUPPLY SYSTEM

(71) Applicant: National Cheng Kung University, Tainan (TW)

(72) Inventors: Shuenn-Yuh Lee, Tainan (TW); Chih-Hung Lee, Chiayi County (TW); Zhan-Xian Liao, Kaohsiung (TW)

(73) Assignee: NATIONAL CHENG KUNG UNIVSERSITY, Tainan (TW)

( * ) Notice: Subject to any disclaimer, the term of this patent is extended or adjusted under 35 U.S.C. 154(b) by 435 days.

(21) Appl. No.: 15/826,659

(22) Filed: Nov. 29, 2017

(65) Prior Publication Data
US 2019/0157983 A1 May 23, 2019

(30) Foreign Application Priority Data
Nov. 20, 2017 (TW) .............. 106140179 A

(51) Int. Cl.
*H02M 7/219* (2006.01)
*H02M 7/23* (2006.01)
*H02J 7/00* (2006.01)
*H02M 1/14* (2006.01)
*H02M 1/00* (2006.01)

(52) U.S. Cl.
CPC .......... *H02M 7/219* (2013.01); *H02J 7/0068* (2013.01); *H02M 1/143* (2013.01); *H02M 7/23* (2013.01); *H02M 2001/0029* (2013.01); *H02M 2001/0045* (2013.01); *H02M 2001/0048* (2013.01); *H02M 2001/0054* (2013.01); *H02M 2007/2195* (2013.01)

(58) Field of Classification Search
CPC ........ H02M 7/219; H02M 1/143; H02M 7/23; H02M 2001/0048; H02M 2001/0029; H02M 2007/2195; H02M 2001/0054; H02M 2001/0045; H02J 7/0068; H02J 50/00
See application file for complete search history.

(56) References Cited

U.S. PATENT DOCUMENTS

| | | | |
|---|---|---|---|
| 2016/0038739 A1* | 2/2016 | Liu | A61N 1/3787 607/45 |
| 2019/0156949 A1* | 5/2019 | Lee | G16H 10/60 |

* cited by examiner

*Primary Examiner* — Jared Fureman
*Assistant Examiner* — Emmanuel Dominique
(74) *Attorney, Agent, or Firm* — Chun-Ming Shih; Lanway IPR Services

(57) ABSTRACT

An energy acquisition and power supply system is provided. The power supply system includes a plurality of power elements, each of the power elements including a transistor capable of conduction path switching, a current regulator having a dynamic substrate selection circuit and a reverse leakage current suppression circuit as well as a voltage regulator, wherein the dynamic substrate selection circuit selects a substrate potential of the transistor capable of conduction path switching dynamically to reduce a substrate leakage current of the transistor capable of conduction path switching, and the reverse leakage current suppression circuit is utilized for switching the power element at a local end to reduce transient reverse leakage current and current consumption of the power element at the local end for an input voltage, such that an output current for the power element at the local end is maximized.

19 Claims, 15 Drawing Sheets

ENERGY ACQUISITION AND POWER SUPPLY SYSTEM

CROSS-REFERENCE TO RELATED APPLICATIONS

This application claims the priority of Republic of China Patent Application No. 106140179 filed on Nov. 20, 2017, in the State Intellectual Property Office of the R.O.C., the disclosure of which is incorporated herein by reference.

BACKGROUND OF THE INVENTION

Field of the Invention

The invention relates to an energy acquisition and power supply system, and particularly, to an energy acquisition and power supply system for power process applied to wearable devices and IoT (Internet of Things).

Descriptions of the Related Art

With increasingly advanced science, subsequent to development of information technologies, such as computers, internet, interconnection network etc., IoT (Internet of Things, IOT) technology has become a hot topic in recent years. Particularly, modern society takes portability of electronic equipments very seriously. For example, physiological signal detection instruments are miniaturized to portable devices. Therefore, modern biomedical products already trend to allow subjects to be cable of monitoring body condition for 24 hours.

Although the biomedical products mentioned above already reduce volume substantially and can monitor physiological signals of subjects for 24 hours, they are still pretty inconvenient for the subjects. If it is feasible to combine a detection reception system with a portable electronic product, such as a mobile phone, a watch or a notebook computer, the burden of a subject could be reduced definitely when a physiological signal extraction system is used.

However, in order for convenience of use for a subject, sufficient power supply is required in addition to reducing power consumption of a detection system. For a power management system, reduction of energy loss on elements is necessary. A conventional full-wave bridge rectifier is achieved by using only one output voltage regulation capacitor. As an example shown in FIG. 1, a CMOS full-wave bridge rectifier, which has a higher energy conversion efficiency, has a smaller output ripple voltage, and is applicable to a high swing input voltage. As shown in FIG. 1, it is composed of 4 diode based MOS transistors (Mn1, Mn2, Mp1, Mp2) and a load capacitor CL, and is of a dual end input. As an input end Vin+ is at a high potential, and an input end Vin− is at a low potential, transistors Mn2 and Mp1 are conducted and charge the load capacitor CL. As the input end Vin− is at a high potential, and the input end Vin+ is at a low potential, transistors Mn1 and Mp2 are conducted and charge the load capacitor CL. When this circuit operates, both threshold voltages of one PMOS transistor and one NMOS transistor have to be exceeded, so that there is a voltage drop of two threshold voltages for an output voltage in each cycle. For reducing the voltage drop of the rectifier to improve power conversion efficiency, cross-coupled CMOS full-wave bridge rectifier, gate and drain biased rectifier, substrate and source biased rectifier as well as floating gate rectifier etc. may also be used. However, full-wave bridge rectifier is challenged with one issue, i.e., leakage current consumption of substrate and latch up of circuit. Generally, the body end of a transistor and the source thereof are equipotential. However, the source end of a full-wave bridge rectifier is connected to an input, so that the voltage at the input end will change with time to result in substrate conduction, which generates leakage current.

By way of an example, refer to FIG. 2A and FIG. 2B in conjunction, in which FIG. 2A is a circuit diagram of a conventional full-wave bridge rectifier, and FIG. 2B is a schematic view showing a cross section of a transistor pair for a substrate leakage current of the transistor of FIG. 2A. In a positive half cycle, as an input signal Vin+ at an input end is at a high potential, and an input signal Vin− at an input end is at a low potential, transistors Mn2 and Mp1 will be conducted. From the cross section of FIG. 2B, a path of a substrate leakage current for a pair of N-well of a P type field effect transistor and a N type field effect transistor is shown. Assume the N-Well is connected to an output voltage Vrtf at an output end and the input voltage Vin+ is greater than the output voltage Vrtf, one parasitic PNP transistor is conducted for the transistor Mp1. On the contrary, if the N-Well is connected to the input voltage Vin+ and the input voltage Vin+ is less than the output voltage Vrtf, another PNP transistor will be conducted. A leakage path will be formed, whether the body of a P type transistor is connected to the input end or the output end. Moreover, with respect to N type transistor, as the input voltage Vin− is less than a ground GND, one parasitic diode will be conducted, forming an unwanted leakage current. The same situation applies to negative half cycle. Therefore, the body end of the transistor has to be controlled appropriately, in order to prevent the parasitic PNP transistor and a parasitic diode from conduction.

Furthermore, in a modern power management system, voltage regulator is also one of important components. Voltage regulators are generally classified into two types, one is switching regulator, and the other is low dropout linear regulator (low dropout regulator, LDO) with simpler built-up members in comparison to the switching regulator, as shown in FIG. 3. Moreover, in a single chip system, a low dropout linear regulator is used more commonly in consideration of factors including area cost and power consumption etc. However, the low dropout linear regulator has a poor energy conversion efficiency and supports voltage decrease only. Further, the low voltage linear regulator needs one transistor to act as a conduction element Mp. Transistors commonly used for the conduction element Mp are classified into bipolar junction transistor or metal oxide semiconductor field effect transistor. The bipolar junction transistor needs to be driven by a base current, while the field effect transistor is driven by a gate voltage, so that the standby current of the field effect transistor is smaller. In addition, as a load current is increased, the base current of the bipolar junction transistor is increased with the load current to increase its quiescent current, while the field effect transistor is a voltage controlled transistor, which quiescent current does not change with the load current. The energy conversion efficiency is defined as the ratio of the output power to the input power. Generally, the output current is much greater than the quiescent current. The smaller the voltage difference of the voltage regulator is, the higher the energy conversion efficiency of the voltage regulator is; larger voltage difference will cause power consumption of the voltage regulator to be converted into thermal energy in a conductive element Rload, such that the temperature of the voltage regulator is increased.

The conduction element Mp of the low dropout linear regulator is mainly capable of converting the input current into the output current. For stability of the voltage regulator and accuracy of the output voltage, the conduction element Mp has to be operated in a saturation region in order for higher open-loop gain of the entire system. The conduction element Mp may be classified into N type field effect transistor and P type field effect transistor. The N type transistor is used as one source follower with a very low output impedance, together with a small output capacitance, to design an output point at a non-dominant pole in order for better stability of the voltage regulator. However, the gate end needs a higher voltage level and the output voltage difference of the voltage regulator has to be larger for driving the N type transistor. Alternatively, the P type transistor is used as the conduction element, which output voltage difference depends on the conduction resistance and the output current. It is advantageous of low output voltage difference and quiescent current. However, for such architecture, the dominant pole is usually designed on the output end, but the dominant pole will change with the output current, so that stability issue has to be considered particularly.

Therefore, those skilled in the art of power supply technology strive for implement one rectifier with low voltage, low loss and high energy conversion efficiency, as well as implement a reference voltage circuit with low power consumption, low temperature coefficient and low voltage effectively in order to achieve an effective power supply system.

SUMMARY OF THE INVENTION

In view of the shortages of the prior art mentioned above, the invention proposes an energy acquisition and power supply system for increasing a conversion efficiency of a full-wave bridge rectifier, and reducing a cost of a low dropout linear regulator. In addition, high order terms of a curve of temperature coefficient are compensated, and a circuit is operated in a low current region for the purposes of temperature coefficient reduction and power consumption reduction.

For the objects said above and for other objects, the invention provides an energy acquisition and power supply system, including: a rectification unit for rectifying an input energy to a DC voltage lower than the input in order to perform a power supply process for a back end circuit, the rectification unit including: a plurality of power elements for rectifying a voltage to a DC voltage by switching a conduction path for the input energy, each of the power elements including a transistor capable of conduction path switching, a current regulator having a dynamic substrate selection circuit and a reverse leakage current suppression circuit as well as a voltage regulator having an adaptive voltage control circuit, wherein the dynamic substrate selection circuit selects a substrate potential of the transistor capable of conduction path switching dynamically to reduce a substrate leakage current of the transistor capable of conduction path switching, and the reverse leakage current suppression circuit is utilized for switching the power element at a local end to reduce transient reverse leakage current and current consumption of the power element at the local end for an input voltage, such that an output current for the power element at the local end is maximized; the adaptive voltage control circuit is used to increase a conduction voltage for lowering a conduction resistance, increasing switching speed when the power element at the local end are conducted in order to improve conversion performance; a voltage regulation capacitor for outputting the DC voltage rectified by the power element as a DC voltage with low ripple, and a first voltage regulation unit for stabilizing and transferring the DC voltage output by the rectification unit to the back end circuit as power supply.

Optionally, two switch transistors are added on a body end of the transistor capable of conduction path switching for the dynamic substrate selection circuit, the body end of the transistor capable of conduction path switching can conduct one of the two switch transistors in correspondence according to potential levels at a voltage input end and a voltage output end for reducing the substrate leakage current of the transistor capable of conduction path switching.

Optionally, the dynamic substrate selection circuit utilizes a deep well structure technology in a CMOS process such that potentials of the transistor capable of conduction path switching and the two switch transistors are separated on one semiconductor substrate.

Optionally, the reverse leakage current suppression circuit is composed of one common-gate-type comparator, such that as an output voltage which is output from the transistor capable of conduction path switching is greater than an input voltage, a gate voltage of the transistor capable of conduction path switching is pulled to the potential of the output voltage for the voltage of an output node to be pulled to a ground potential through an output stage rapidly; on the contrary, as an output voltage which is output from the transistor capable of conduction path switching is less than an input voltage, an gate voltage of the transistor capable of conduction path switching is pulled to a ground potential for the voltage of an output node to be pulled to the input voltage through an output stage rapidly, such that the gate of the transistor capable of conduction path switching achieves a rapid conduct signal and suppresses a reverse leakage current.

In an embodiment of the invention, the first voltage regulation unit includes: a first temperature curvature compensation reference voltage circuit and a first high stability linear voltage regulation circuit, the first temperature curvature compensation reference voltage circuit including: a first (N-1) order temperature curvature compensation positive reference voltage circuit, a first (N-1) order temperature curvature compensation negative reference voltage circuit and a first adder, the first temperature curvature compensation reference circuit performing temperature compensation according to a DC voltage output from the voltage regulation capacitor of the rectification unit, wherein the first (N-1) order temperature curvature compensation positive reference voltage circuit is used for generating a (N-1) order temperature curvature compensation positive reference voltage positively correlated with a temperature, the first (N-1) order temperature curvature compensation negative reference voltage circuit is used for generating a (N-1) order temperature curvature compensation negative reference voltage negatively correlated with a temperature, and the first adder is used for adding up the first (N-1) order temperature curvature compensation positive reference voltage and the first (N-1) order temperature curvature compensation negative reference voltage to output a first temperature compensation reference voltage, in order for being applicable to a large temperature range of N order temperature curvature compensation reference voltage.

In an embodiment of the invention, the first voltage regulation unit further includes: a first high stability linear voltage regulation circuit, which includes: a first error amplifier, a first stability enhancer, a first conduction element and a first high impedance feedback network, the first error amplifier receives a DC voltage output from a voltage regulation capacitor of the rectification unit, a first temperature compensation reference voltage output from the first temperature curvature compensation reference voltage circuit, and a feedback voltage output from the first high impedance feedback network, as well as adjusts a conduction voltage which is output for conducting the first conduction element (such as transistor), while the first stability enhancer is arranged between the first error amplifier and the first conduction element to enhance the stability of the entire circuit, and a steady DC voltage is converted from the received input voltage by the first conduction element for the back end circuit, wherein as the output DC voltage changes with the back end circuit, the output DC voltage is fed back to the first error amplifier and the first stability enhancer through the first high impedance feedback network for adjusting the output DC voltage, and transferred to the back end circuit via the first conduction element.

In an embodiment of the invention, the first error amplifier operates in a low bias current mode and the high impedance feedback network is implemented in a manner of a large impedance as a transistor in a cutoff region to achieve a low quiescent current.

In an embodiment of the invention, the first stability enhancer in the first high stability linear voltage regulation circuit includes: a first voltage buffer and a first pole-zero tracking circuit, in which a parasitic capacitance at an output of the first error amplifier is an input capacitance of the first voltage buffer, wherein the input capacitance is less than a parasitic capacitance at an gate end of the first conduction element, and an input impedance of the first conduction element is an output impedance of the first conduction element, wherein the input impedance is less than an output impedance of the first error amplifier, such that an original non-dominant pole is divided into two higher frequency non-dominant poles; the first pole-zero tracking circuit allows the first conduction element to be capable of performing pole-zero compensation with a dominant pole through resistor and capacitor in conjunction with a feedback mechanism of the first conduction element, adjusts the resistance of a resistor in connection with the first conduction element, and forms a fixed magnification with an equivalent resistance of the first conduction element to achieve compensation of dominant pole, whereby a unity gain frequency moves toward a high frequency for more stable voltage regulation process, and for increase of response speed under a stable condition.

In an embodiment of the invention, the energy acquisition and power supply system further includes at least a power supply battery and a charging/power supply determination unit, which is used for the at least a power supply battery to store a rectified DC voltage flowed from the rectification unit, for controlling the at least a power supply battery to supply a power stored therein to the back end circuit.

In an embodiment of the invention, a power supply path between the at least a power supply battery and the back end circuit is provided with a second voltage regulation unit, which further includes: a second high stability linear voltage regulation circuit, which includes: a second error amplifier, a second stability enhancer, a second conduction element (such as transistor) and a second high impedance feedback network, the second error amplifier receives a DC voltage output from a voltage regulation capacitor of the rectification unit, a second temperature compensation reference voltage output from the second temperature curvature compensation reference voltage circuit, and a feedback voltage output from the second high impedance feedback network, as well as adjusts a conduction voltage which is output for conducting the second conduction element, while the second stability enhancer is arranged between the second error amplifier and the second conduction element to enhance the stability of the entire circuit, and a steady DC voltage is converted from the received input voltage by the second conduction element for the back end circuit, wherein as the output DC voltage changes with the back end circuit, the output DC voltage is fed back to the second error amplifier and the second stability enhancer through the second high impedance feedback network for adjusting the output DC voltage, and transferred to the back end circuit via the second conduction element.

In an embodiment of the invention, the second stability enhancer in the second high stability linear voltage regulation circuit includes: a second voltage buffer and a second pole-zero tracking circuit, in which a parasitic capacitance at an output of the second error amplifier is an input capacitance of the second voltage buffer, wherein the input capacitance is less than a parasitic capacitance at an gate end of the second conduction element, and an input impedance of the second conduction element is an output impedance of the second conduction element, wherein the input impedance is less than an output impedance of the second error amplifier, such that an original non-dominant pole is divided into two higher frequency non-dominant poles; the second pole-zero tracking circuit allows the second conduction element to be capable of performing pole-zero compensation with a dominant pole through resistor and capacitor in conjunction with a feedback mechanism of the second conduction element, adjusts the resistance of a resistor in connection with the second conduction element, and forms a fixed magnification with an equivalent resistance of the second conduction element to achieve compensation of dominant pole, whereby a unity gain frequency moves toward a high frequency for more stable voltage regulation process, and for increase of response speed under a stable condition.

In an embodiment of the invention, the energy acquisition and power supply system further includes a boost unit, which is used for rectifying the input energy to a DC voltage higher than an input in order to perform the power supply process for another back end circuit.

In an embodiment of the invention, a power supply path from the boost unit to the another back end circuit is provided with a third voltage regulation unit, which further includes: a third high stability linear voltage regulation circuit, which includes: a third error amplifier, a third stability enhancer, a third conduction element and a third high impedance feedback network, the third error amplifier receives a DC voltage output from a voltage regulation capacitor of the rectification unit, a third temperature compensation reference voltage output from the third temperature curvature compensation reference voltage circuit, and a feedback voltage output from the third high impedance feedback network, as well as adjusts a conduction voltage which is output for conducting the third conduction element, while the third stability enhancer is arranged between the third error amplifier and the third conduction element to enhance the stability of the entire circuit, and a steady DC voltage is converted from the received input voltage by the third conduction element for the another back end circuit, wherein as the output DC voltage changes with the back end circuit, the output DC voltage is fed back to the third error amplifier and the third stability enhancer through the third high impedance feedback network for adjusting the output DC voltage, and transferred to the another back end circuit via the third conduction element.

In an embodiment of the invention, the third stability enhancer in the third high stability linear voltage regulation circuit includes: a third voltage buffer and a third pole-zero tracking circuit, in which a parasitic capacitance at an output of the third error amplifier is an input capacitance of the third voltage buffer, wherein the input capacitance is less than a parasitic capacitance at an gate end of the third conduction element, and an input impedance of the third conduction element is an output impedance of the third conduction element, wherein the input impedance is less than an output impedance of the third error amplifier, such that an original non-dominant pole is divided into two higher frequency non-dominant poles; the third pole-zero tracking circuit allows the third conduction element to be capable of performing pole-zero compensation with a dominant pole through resistor and capacitor in conjunction with a feedback mechanism of the third conduction element, adjusts the resistance of a resistor in connection with the third conduction element, and forms a fixed magnification with an equivalent resistance of the third conduction element to achieve compensation of dominant pole, whereby a unity gain frequency moves toward a high frequency for more stable voltage regulation process, and for increase of response speed under a stable condition.

Compared to the conventional technology, the energy acquisition and power supply system proposed in the invention comprises a high energy conversion efficiency rectification unit, a pole-zero compensation linear voltage regulation unit and a temperature curvature compensation reference voltage circuit. The high energy conversion efficiency rectification unit includes a power element and a voltage regulation capacitor therein. The power element, which is capable of energy conduction, includes a current regulator and a voltage regulator, which are capable of reducing leakage current and reducing output and input voltage differences separately for the purpose of improving energy conversion efficiency. The voltage regulation capacitor facilitates to stabilize the output voltage. Accordingly, one rectifier with low voltage, low loss and high energy conversion efficiency can be implemented. Moreover, the pole-zero compensation linear voltage regulation unit includes an error amplifier, a stability enhancer, a power element and a feedback network therein. The error amplifier enhances the accuracy of the output voltage; the stability enhancer is capable of stability enhancement, while the feedback network detects and feeds back the output voltage to the error amplifier and reduces a quiescent current. Accordingly, one voltage regulator with low power consumption, low area and high stability is implemented. In the temperature curvature compensation reference voltage circuit, with a (N-1) order reference voltage circuit featuring positive correlation of temperature and negative correlation of temperature, in conjunction with implementation of low power circuit, the issue that the output voltage changes with temperature is mitigated, such that one reference voltage circuit with low power consumption, low temperature coefficient and low voltage is implemented. In a boost unit, a voltage is increased through a conduction element and a pulse controlled capacitor for the input signal, wherein a charge transfer auxiliary transistor and a dynamic control auxiliary transistor are utilized to avoid the issue of charge redistribution, reduce voltage drop during conversion and, through a cross-coupled output stage, reduce the voltage loss of the output stage and, in turn, increase the efficiency of the boost unit. The system also comprises a voltage regulation unit, which may reduce the temperature coefficient of the voltage regulation unit by having a temperature curvature compensation reference voltage circuit and a high linearity linear voltage regulator, increasing the dynamic range of output load current.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
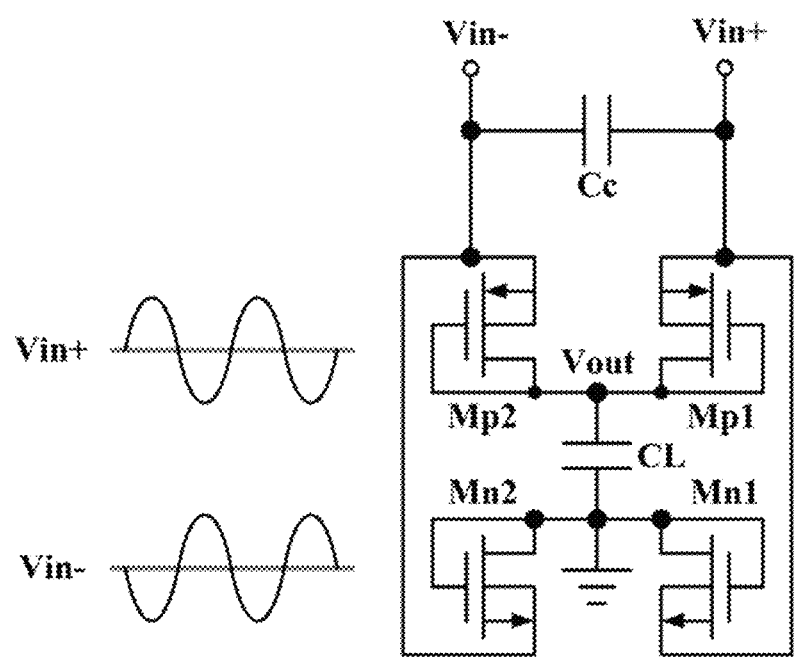
FIG. 1 is a circuit diagram showing a conventional CMOS full-wave bridge rectifier.
Figure 2A:
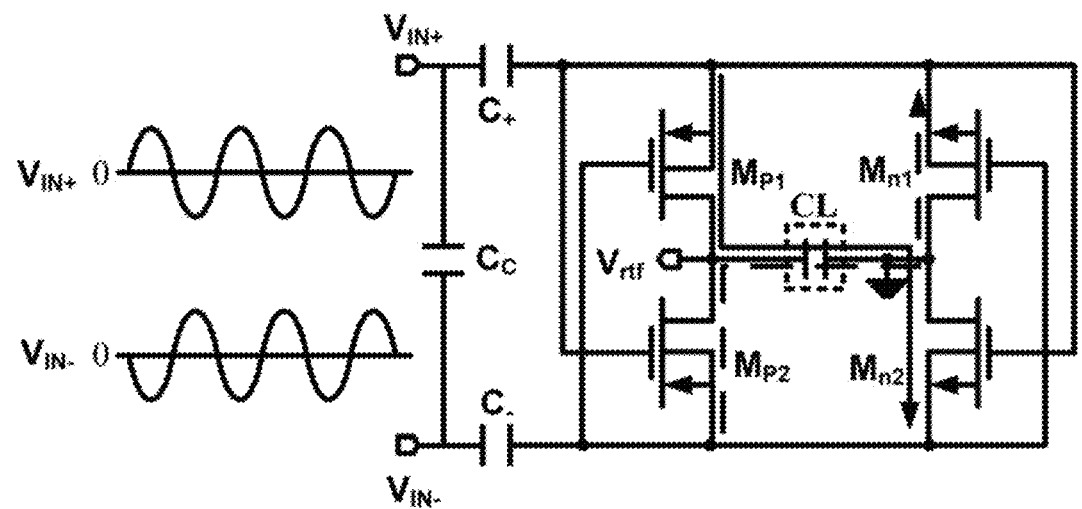
FIG. 2A is a circuit diagram of a conventional full-wave bridge rectifier.
Figure 2B:
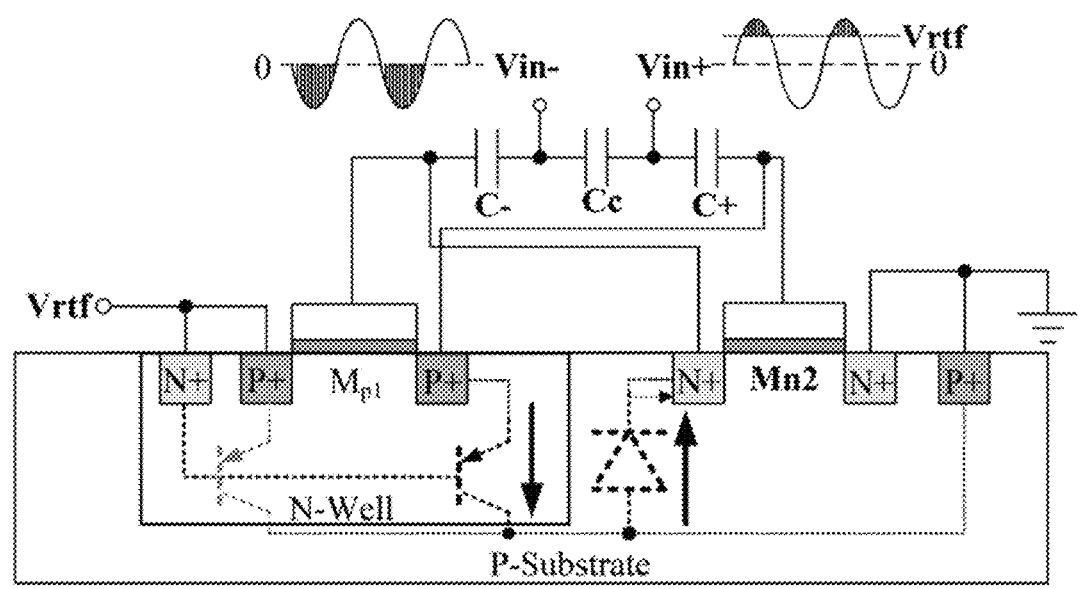
FIG. 2B is a schematic view showing a cross section of a transistor pair for a substrate leakage current of the transistor of FIG. 2A.
Figure 3:
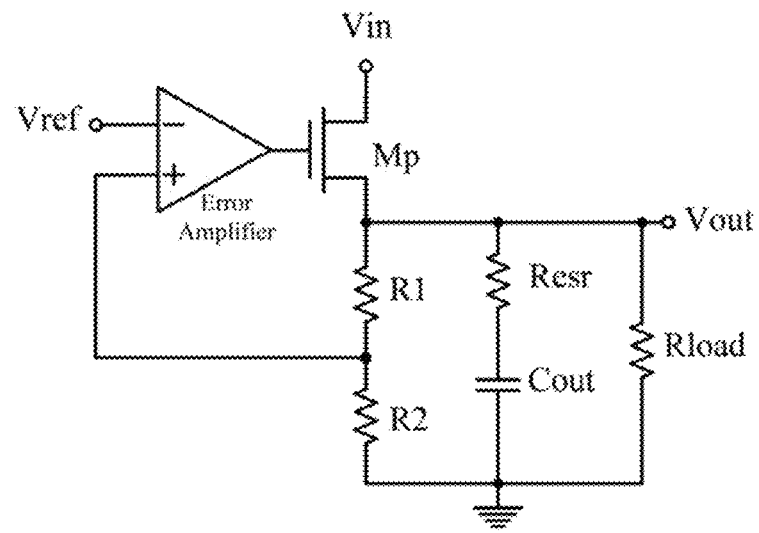
FIG. 3 is a circuit diagram showing a conventional low dropout linear regulator.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 4:
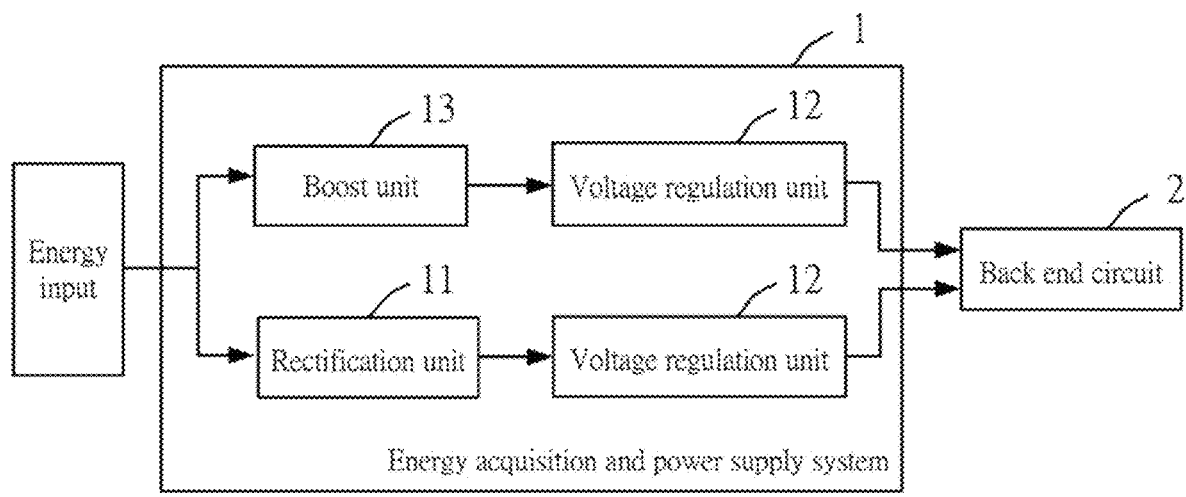
FIG. 4 is a block diagram showing a basic architecture for an example of an energy acquisition and power supply system according to the invention.

Refer to FIG. 4, which is a basic architecture diagram of system showing an energy acquisition and power supply system according to the invention. A power input is received for a back end circuit 2 to use by an energy acquisition and power supply system 1, which includes a rectification unit 11, a voltage regulation unit 12 and a boost unit 13. The back end circuit 2 includes an analog to digital converter, a filter and a digital signal processing circuit etc. The power input may be an input of solar energy, RF (Radio Frequency) energy, AC electrical energy or piezoelectric vibration energy etc. It is noted particularly that the system architecture of the energy acquisition and power supply system 1 according to the invention is not limited to the example shown in FIG. 4. In other words, in another example of the energy acquisition and power supply system 1, as the energy acquisition and power supply system according to the invention is used for rectifying an input energy to a DC voltage lower than the input to perform a power supply process for the back end circuit 2, only the rectification unit 11 and the voltage regulation unit 12 are required. For example, a phone may be utilized to generate an energy through a headphone jack channel, and convert an audio AC signal into a DC voltage via the rectification unit 11. In a further example of the energy acquisition and power supply system 11, as the energy acquisition and power supply system 1 according to the invention is used for rectifying an input energy to a DC voltage higher than the input to perform the power supply process for the back end circuit 2, only the boost unit 13 and the voltage regulation unit 12 are required. Variations differ depending on required implementations.

Figure 5:
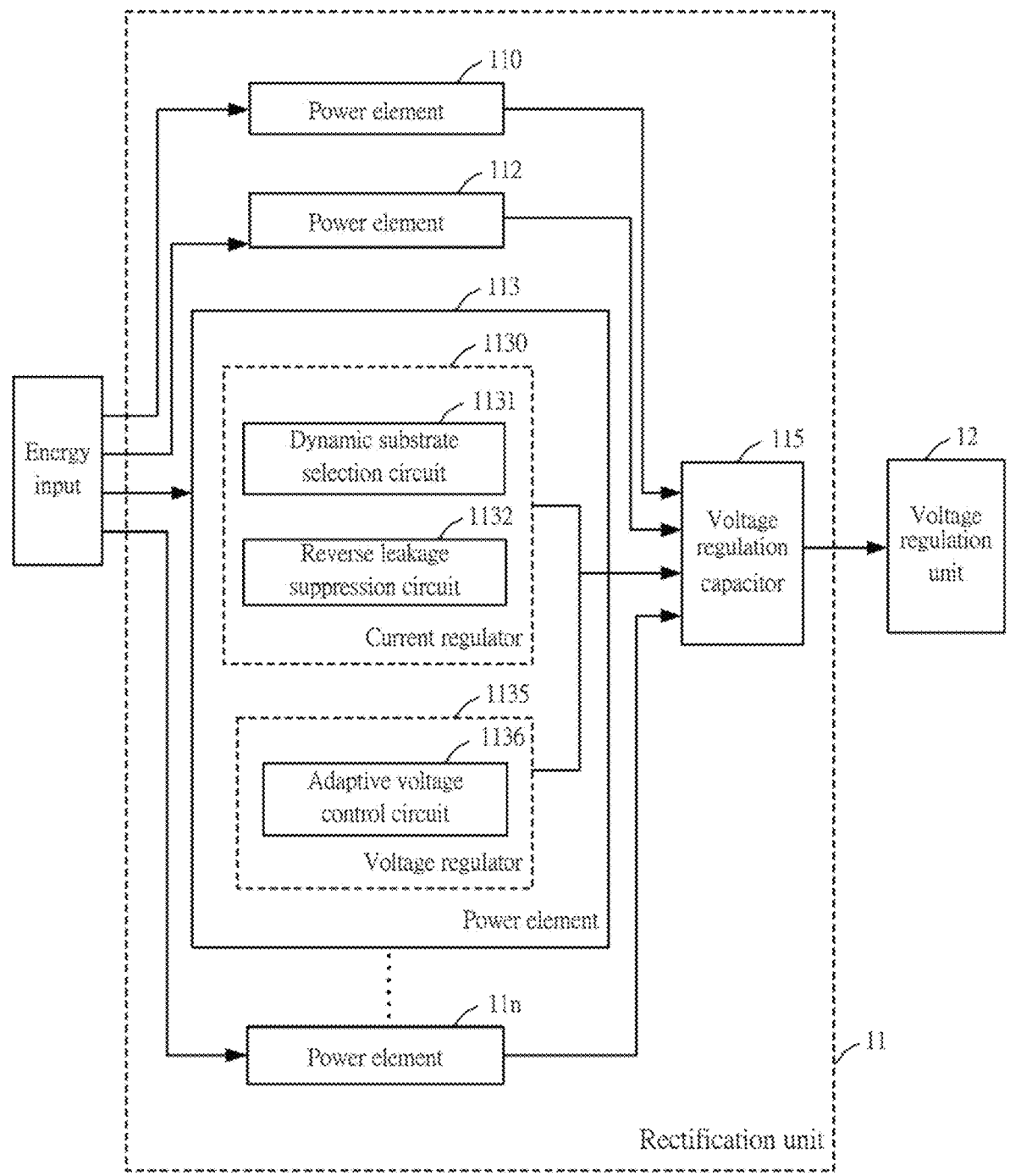
FIG. 5 is a block diagram illustrating a basic architecture for a rectification unit of the energy acquisition and power supply system according to the invention shown in FIG. 4.

Refer to FIG. 5 in conjunction, which shows a basic architecture for the rectification unit 11 of the energy acquisition and power supply system 1 according to the invention. The rectification unit 11 in this example is, for example, a full-wave bridge rectifier. The rectification unit 11 of the energy acquisition and power supply system 1 according to the invention includes numerous power elements (110 ~ 11n) and a voltage regulation capacitor 115 for reducing output voltage ripple. Each power element (110 ~ 11n) of the rectification unit 11 of the energy acquisition and power supply system 1 according to the invention includes a transistor capable of conduction path switching, a current regulator 1130 as well as a voltage regulator 1135, wherein the current regulator 1130 and the voltage regulator 1135 is used for addressing leakage current and latch up of substrate of MOS transistors of the conventional full-wave bridge rectifier. As shown in FIG. 5, a current regulator 1130 includes a dynamic substrate selection circuit 1131 and a reverse leakage current suppression circuit 1132, while a voltage regulator 1135 has an adaptive voltage control circuit 1136, wherein an input energy is the multiplication of an input voltage and an input current, while an output energy is the multiplication of an output voltage and an output current. The power elements (110 ~ 11n) are used to switch an input energy by utilizing a conduction path, and an DC voltage to be output is rectified to a low ripple DC voltage via the voltage regulation capacitor 115. The current regulator 1130 selects a substrate potential dynamically through a dynamic substrate selection circuit to reduce leakage current due to parasitic transistor, and the reverse leakage current suppression circuit 1132 is utilized to switch the power element at a local end rapidly to reduce transient reverse leakage current and current consumption of the power element on the local end for input waveform, such that the output current is maximized. The voltage regulator 1135 utilizes a transistor to discharge an auxiliary capacitor through the adaptive voltage control (AVC) circuit 1136 for reducing the conduction resistance of the power element 113 at the local end, reducing the voltage difference between the input voltage and the output voltage, and reducing the loss of the power element 113 on the local end, such that the output voltage is maximized. Therefore, a high energy conversion efficiency rectifier is achieved.

Figure 6:
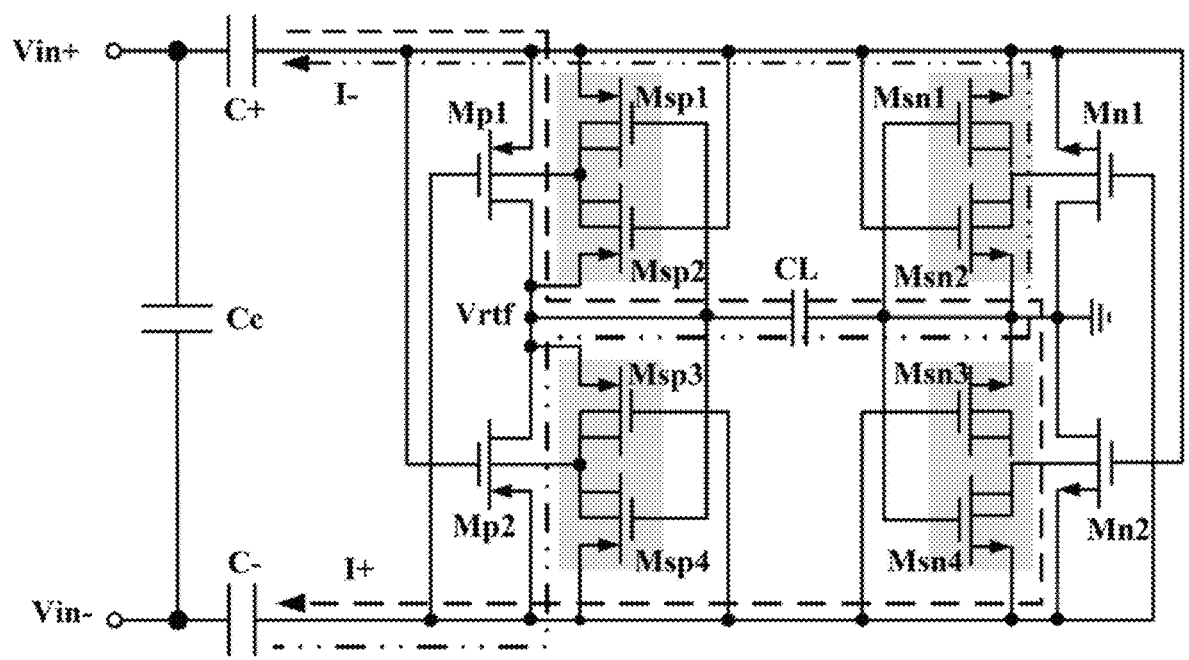
FIG. 6 is an example view of circuit illustrating a dynamic substrate selection circuit shown in FIG. 5.

As shown in FIG. 6, an example view of circuit for the dynamic substrate selection circuit 1131 of FIG. 5 is shown. The dynamic substrate selection circuit 1131 of this example is applied to a full-wave bridge rectifier. Two switch transistors (Msp1 and Msp2, Msp3 and Msp4, Msn1 and Msn2, Msn3 and Msn4) are added on the body end of each transistor (Mp1, Mp2, Mn1, Mn2) for the dynamic substrate selection circuit 1131. With respect to the P type transistor (Mp1, Mp2), either the input end Vin+/Vin− or the output end Vrtf is selected for the body end of the P type transistor (Mp1, Mp2) depending on which end is at a high potential. With respect to the N type transistor (Mn1, Mn2), either the input end Vin+/Vin− or the ground GND is selected for the body end of the N type transistor (Mn1, Mn2) depending on which end is at a low potential. Wherein, in a CMOS process, a dynamic substrate selection technology for the P type transistor may be implemented by controlling the potential of the N-well of a bipolar junction transistor. However, with respect to the N type transistor, for implementing such technology, a deep N-well in a CMOS process has to be utilized to manufacture one independent potential separated from a P-substrate, in order to suppress leakage current for substrate.

Figure 7:
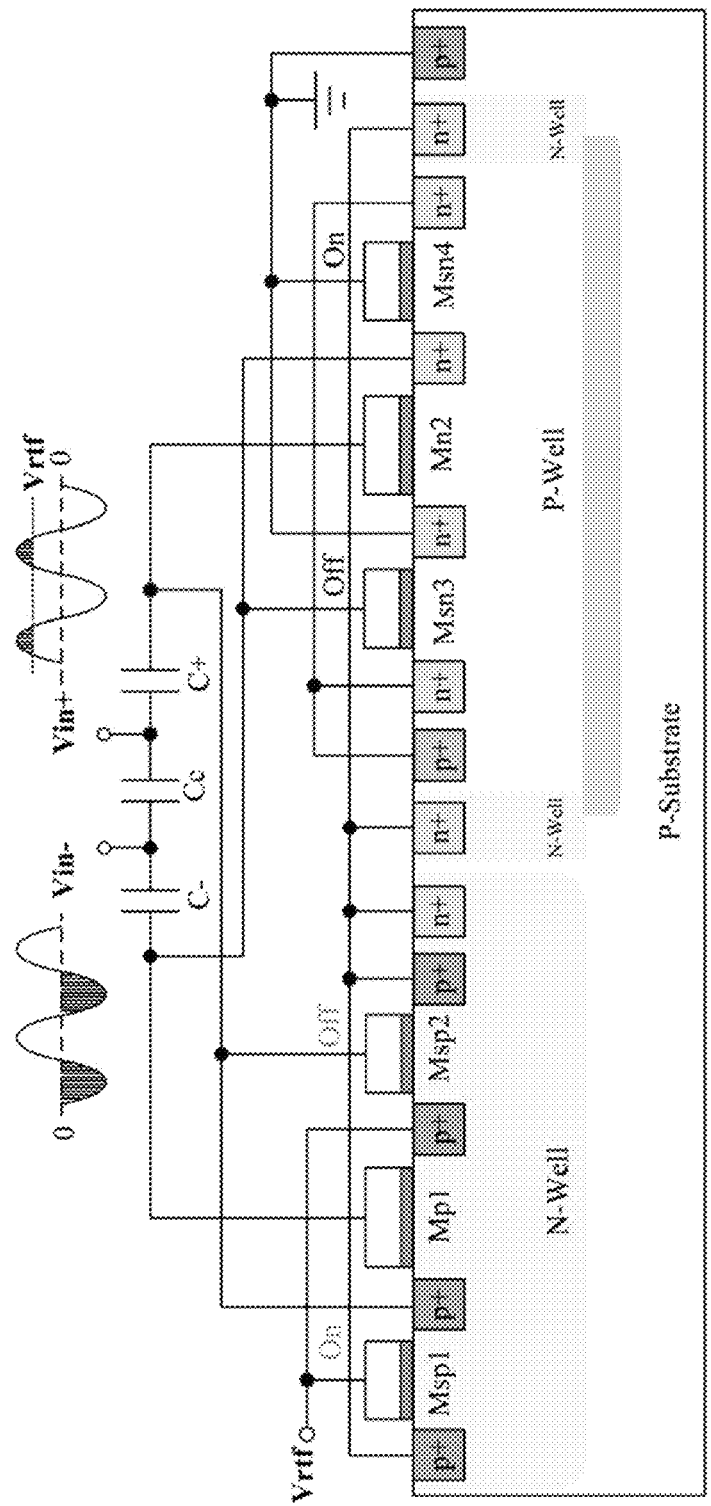
FIG. 7 is an example cross sectional view illustrating the dynamic substrate selection circuit shown in FIG. 6 implemented with a substrate process.

As shown in FIG. 7, an example cross sectional view of the dynamic substrate selection circuit 1131 implemented in a substrate process is shown. In a positive half cycle, as the input voltage Vin+ is greater than the output voltage Vrtf, the transistor Msp1 will be conducted, such that the potential of the N-well and the potential of the input voltage Vin+ are equal, and a leakage path of a parasitic PNP transistor cannot be generated accordingly; as the input voltage Vin− is less than the ground GND, the transistor Msn4 will be conducted, such that the potential of the P-well and the potential of the input voltage Vin− are equal, and a leakage path of a parasitic diode cannot be generated. The same situations apply to a negative half cycle. Hence, the leakage current for the substrate can be suppressed as long as the N-well maintains a high potential, and the P-well maintains a low potential.

Figure 8:
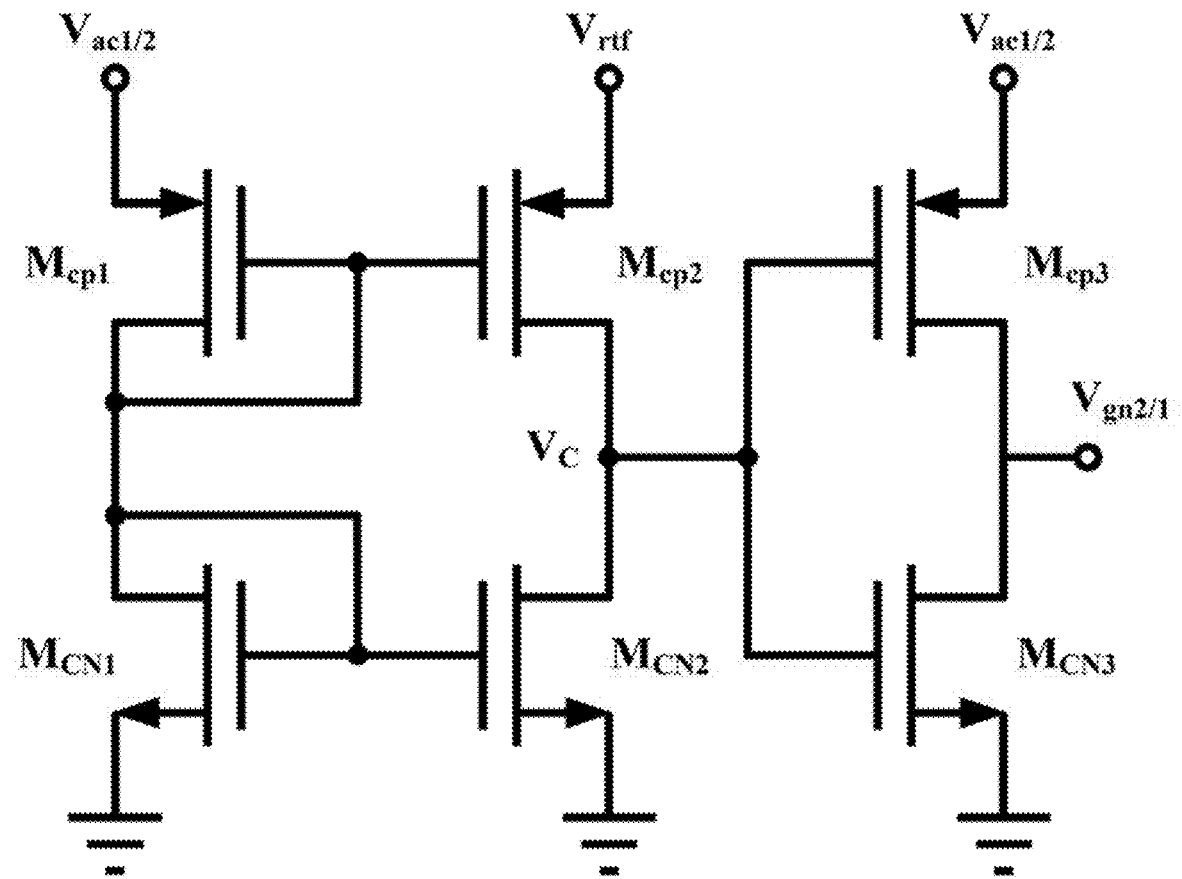
FIG. 8 is an example view of circuit illustrating a reverse leakage current suppression circuit shown in FIG. 5.

Not only the transistors mentioned above influence the energy conversion efficiency for the leakage current of a substrate, but also another reverse leakage current will reduce the energy conversion efficiency of a rectifier. The gate control signal of a main transistor comes from an input voltage, while the input voltage is a sinusoidal signal, instead of a rapid clock signal, so that rapid switching between a positive half cycle and a negative half cycle is impossible, and a reverse leakage current is generated accordingly. To prevent the reverse leakage current, a rapid control signal has to be generated, such that the transistor can be switched rapidly. Therefore, the current regulator 1130 according to the invention further uses the reverse leakage current suppression circuit 1132 to suppress the reverse leakage current. The reverse leakage current suppression circuit is comprised of one common-gate-type comparator. As shown in FIG. 8, a circuit diagram of a common-gate-type comparator is shown. As an output voltage Vrtf is greater than an input voltage Vac1/2, a node voltage Vc is pulled to the potential of the input voltage Vrtf, and a node voltage Vgn2/1 is pulled to the ground GND through an output stage rapidly; on the contrary, as the output voltage Vrft is less than the input voltage Vac1/2, the node voltage Vc is pulled to the potential of the ground GND, and the node voltage Vgn2/1 is pulled to the input voltage Vac1/2 through the output stage rapidly, such that the gate of the main transistor can achieve a rapid control signal and suppress the reverse leakage current.

Figure 9:
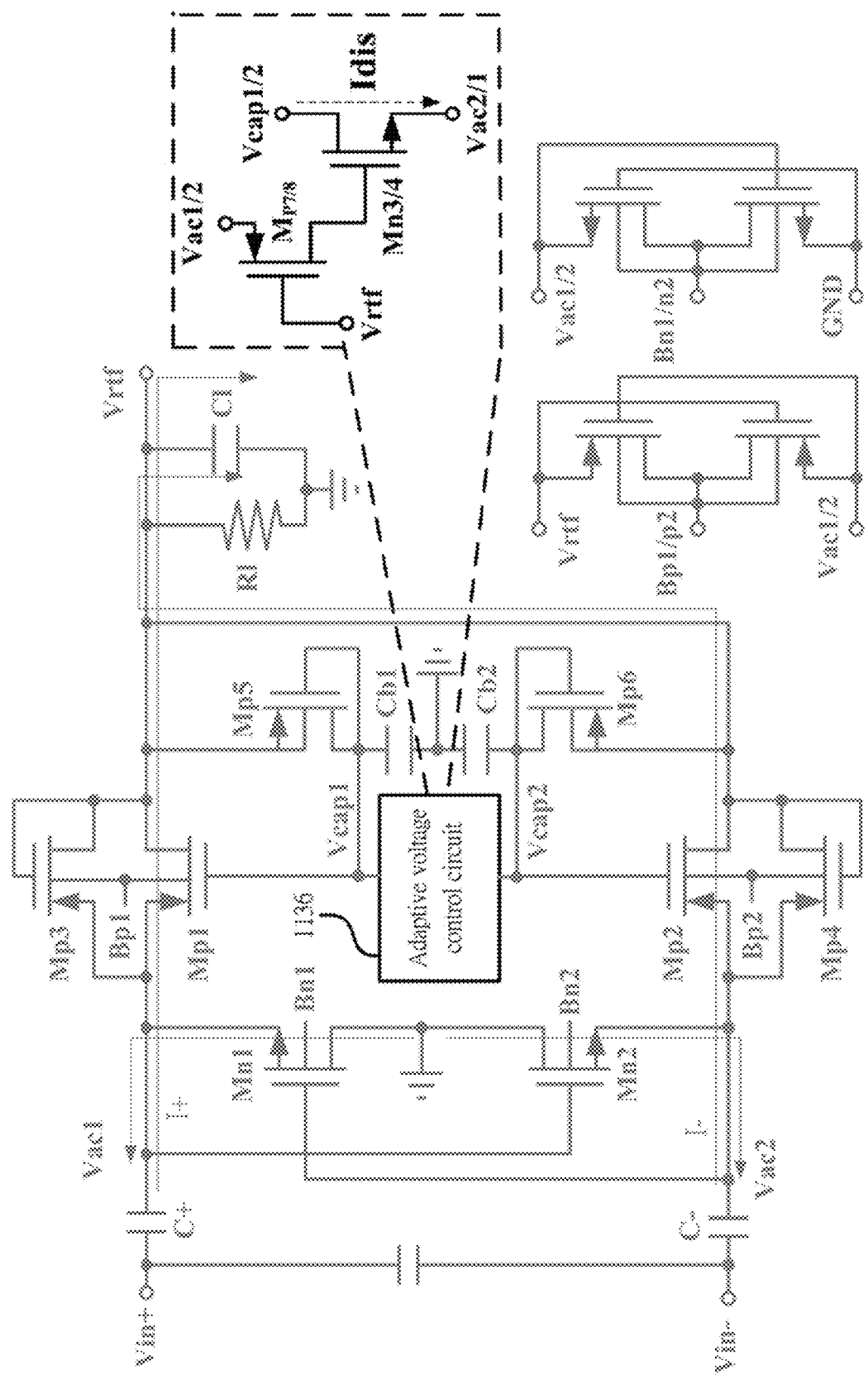
FIG. 9 is an example view of circuit illustrating an adaptive voltage control circuit shown in FIG. 5.
Figure 10:
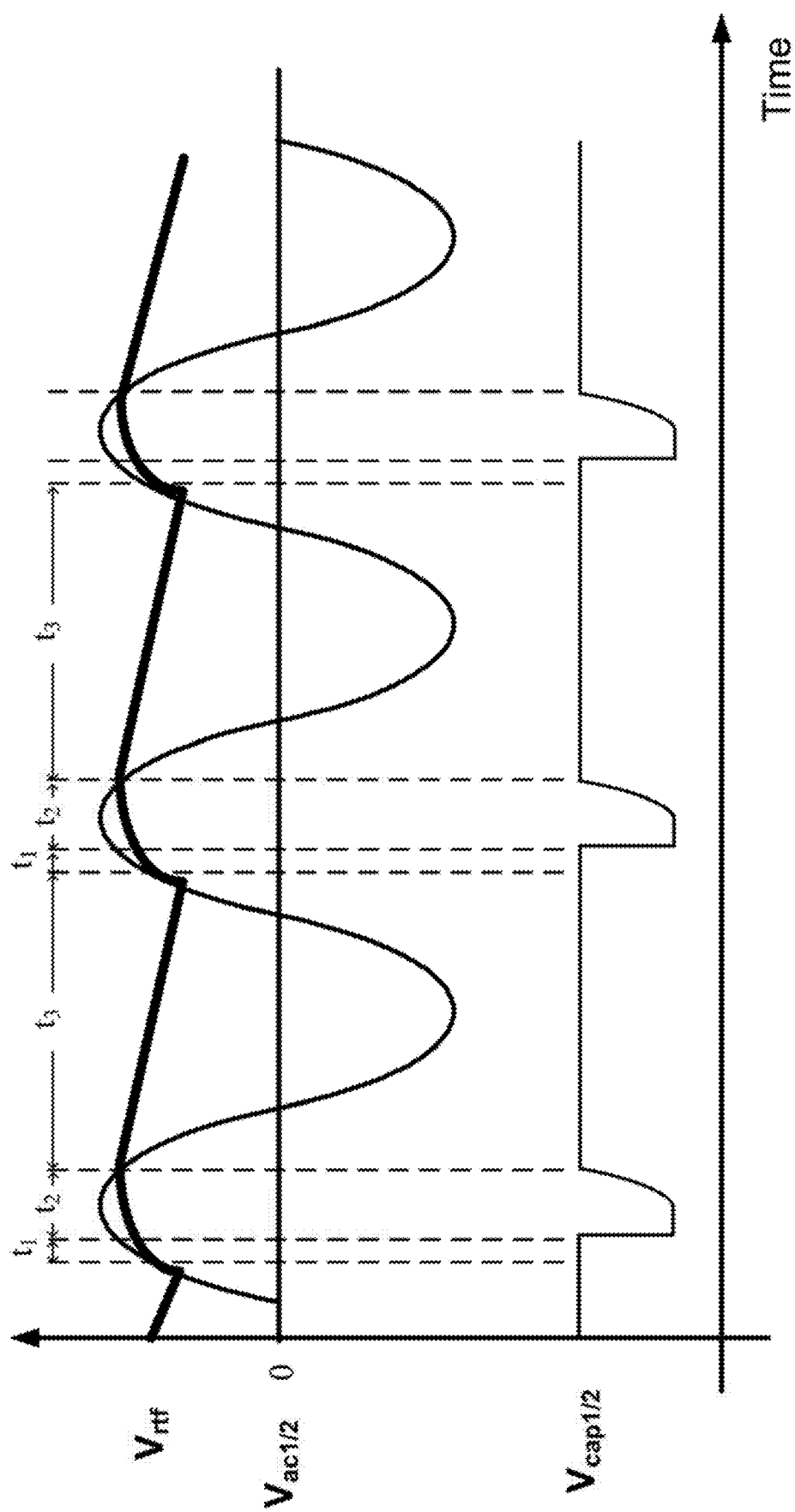
FIG. 10 is a view illustrating operation transient of the adaptive voltage control circuit shown in FIG. 5.

However, the voltage difference between the body end and the source of the main transistor cannot maintain zero by using the dynamic substrate selection technology, so that a threshold voltage will increase with substrate effect, resulting in increased voltage difference between the output voltage and the input voltage of the rectifier. That is, a conduction resistance exists in the main transistor, so that higher energy conversion efficiency cannot be achieved in measurement. To address such issue, the adaptive voltage control (AVC) circuit 1136 is added to the power elements in the rectification unit 11 of the energy acquisition and power supply system according to the invention, in order for increasing the conduction voltage to reduce the conduction resistance when the power element at the local end is conducted, such that a switching speed is increased to improve conversion performance. As shown in FIG. 9, the adaptive voltage control circuit 1136 is used for increasing a voltage Vgs to reduce the conduction resistance as the main transistor (Mp1, Mp2) is conducted. As shown in FIG. 10, a view for operation transient of an adaptive voltage control circuit is shown. For its operation principle: in t1 period, a current charges an output capacitor Cl and capacitors (Cb1, Cb2); in t2 period, an input voltage (Vac1/2) is greater than an output voltage Vrtf by one threshold voltage for a transistor (Mp7/8) to be conducted, and a transistor (Mn3/4) is activated to charge a node (Vacp1/2), such that the source-gate voltage (Vsg) of the transistor (Mp1, Mp2) is increased to reduce the conduction resistance, a discharging current Idis thereof being injected into another input end Vac2/1 for such mechanism to be free of extra current loss, increasing the energy conversion efficiency of the rectifier; in t3 period, the output voltage Vrtf is higher than the input voltage Vac1/2, and the adaptive voltage control circuit is turned off.

Figure 11:
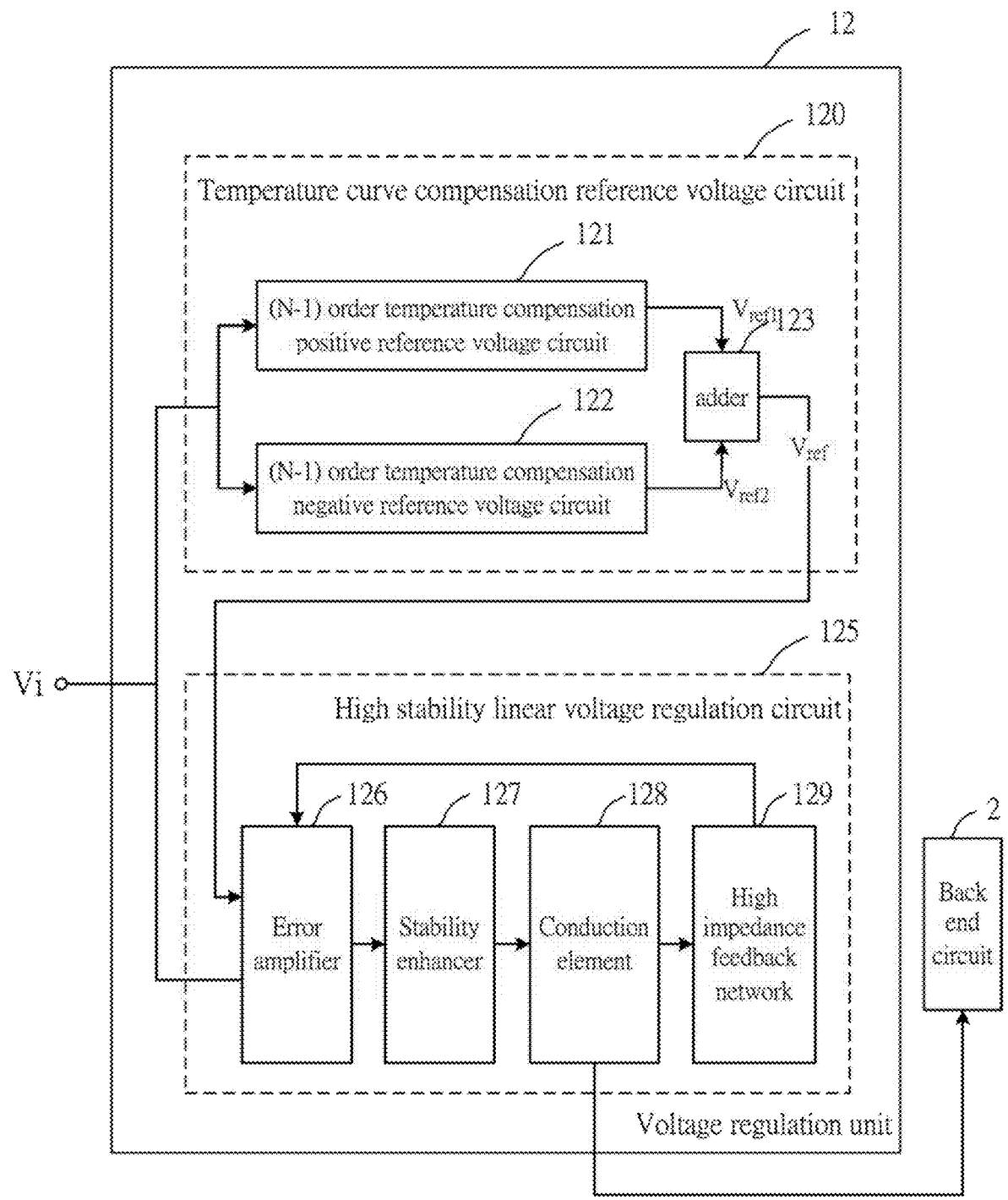
FIG. 11 is a block diagram illustrating a system architecture for a voltage regulation unit of the energy acquisition and power supply system according to the invention shown in FIG. 5.

Next, Refer to FIG. 11, in which a block diagram of system for the voltage regulation unit 12 of the energy acquisition and power supply system 1 according to the invention is shown. The voltage regulation unit 12 of this example is a low dropout linear regulator (LDO). The voltage regulation unit 12 includes a temperature curvature compensation reference voltage circuit 120 and a high stability linear voltage regulation circuit 125. The temperature curvature compensation reference voltage circuit 120, which is characterized by low voltage, high power voltage rejection ratio, low power consumption and low temperature coefficient, is applicable to an environment with large variation of temperature range. The temperature curvature compensation reference voltage circuit 120 includes a (N-1) order temperature curvature compensation positive reference voltage circuit 121, a (N-1) order temperature curvature compensation negative reference voltage circuit 122 and an adder 123. The temperature curvature compensation reference circuit 120 starts operation thereof with trigger of an input voltage Vi. The (N-1) order temperature curvature compensation positive reference voltage circuit 121 is used to generate a (N-1) order temperature curvature compensation positive reference voltage which is positively correlated with temperature, and the (N-1) order temperature curvature compensation negative reference voltage circuit 122 is used to generate a (N-1) order temperature curvature compensation negative reference voltage which is negatively correlated with temperature, while the adder 123 uses the (N-1) order temperature curvature compensation positive reference voltage and the (N-1) order temperature curvature compensation negative reference voltage to perform a compensation mechanism for adding up currents, in order for achieving a N order temperature curvature compensation reference voltage Vref applicable to a large temperature range.

Figure 12:
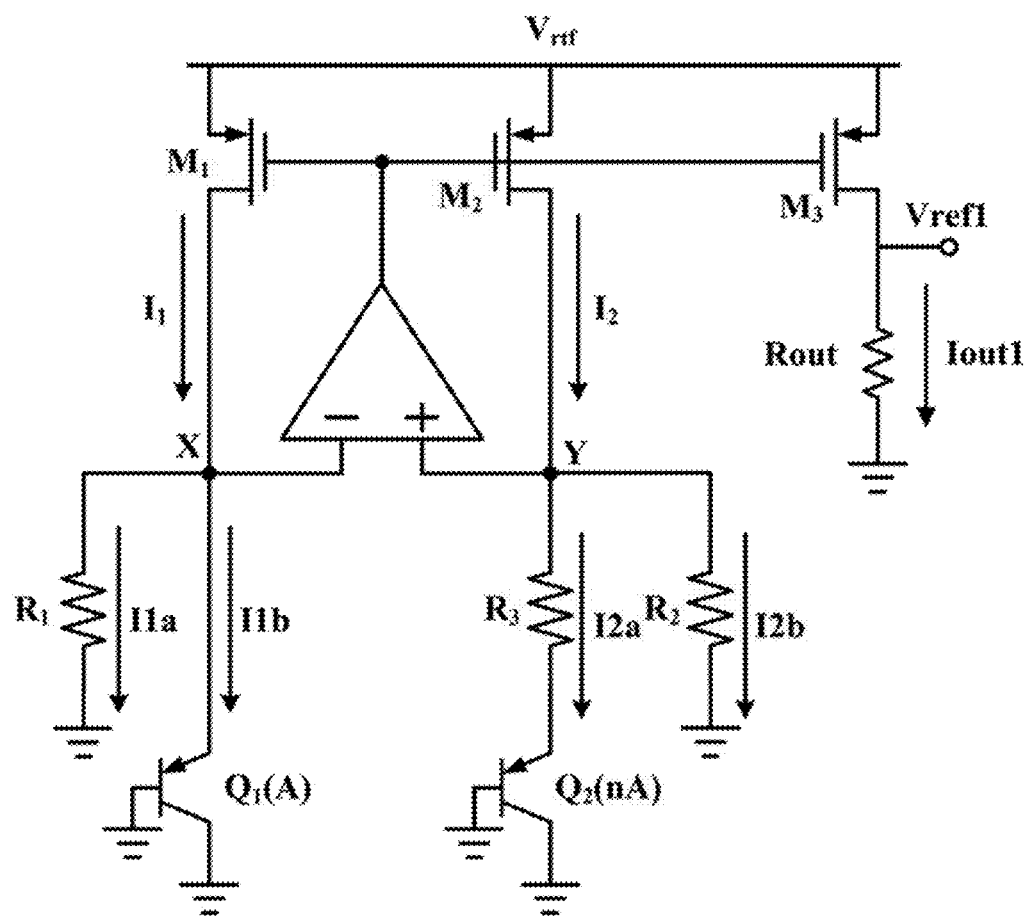
FIG. 12 is an example of circuit illustrating a (N-1) order temperature curvature compensation positive reference voltage circuit in FIG. 11.

Specifically, a reference voltage generated by a conventional reference voltage circuit under a condition of room temperature is about 1.3 V, but a reference voltage of a linear voltage regulator of the system is 0.6 V. In order to meet specifications of the energy acquisition and power supply system according to the invention, one reference voltage circuit with low voltage output is required for a low dropout linear regulator to use. As shown in FIG. 12, an example of circuit for the (N-1) order temperature curvature compensation positive reference voltage circuit 121 is shown. Compared to a conventional architecture, two resistors R1 and R2 are increased for the circuit of such architecture additionally to generate a current complementary to absolute temperature voltage (CTAT). Moreover, resistances of the resistors R1 and R2 are configured to be equal. An ideal operational amplifier allows potentials of nodes X and Y to be equal. Sizes of three bias transistors (M1, M2, M3) are the same. After ignoring length modulation effect, three bias currents (I1, I2, I3) are equal. The area ratio of the emitters of two transistors Q1 and Q2 is 1:n. The emitter-base voltage difference and the resistor R1 form one current I2$a$, wherein the current I2$a$, which is a current positively correlated with absolute temperature (proportional to absolute temperature, PTAT), and I2$b$, which is a CTAT current, are added up to obtain a first order temperature compensation current I2. An across voltage of an output resistance Rout is a reference voltage Vref1. For the architecture shown in FIG. 12, compared to a conventional reference voltage circuit, the output resistance Rout determines the reference voltage Vref1 of such architecture, there is no need to be proportional to other resistance for compensating for temperature coefficient. Moreover, higher order terms of temperature exist for the reference voltage Vref1. This voltage is a function of a finite curvature. Its curvature is zero at a certain temperature, but is positive or negative at other temperatures, so that a function with downward opening is obtained.

Figure 13:
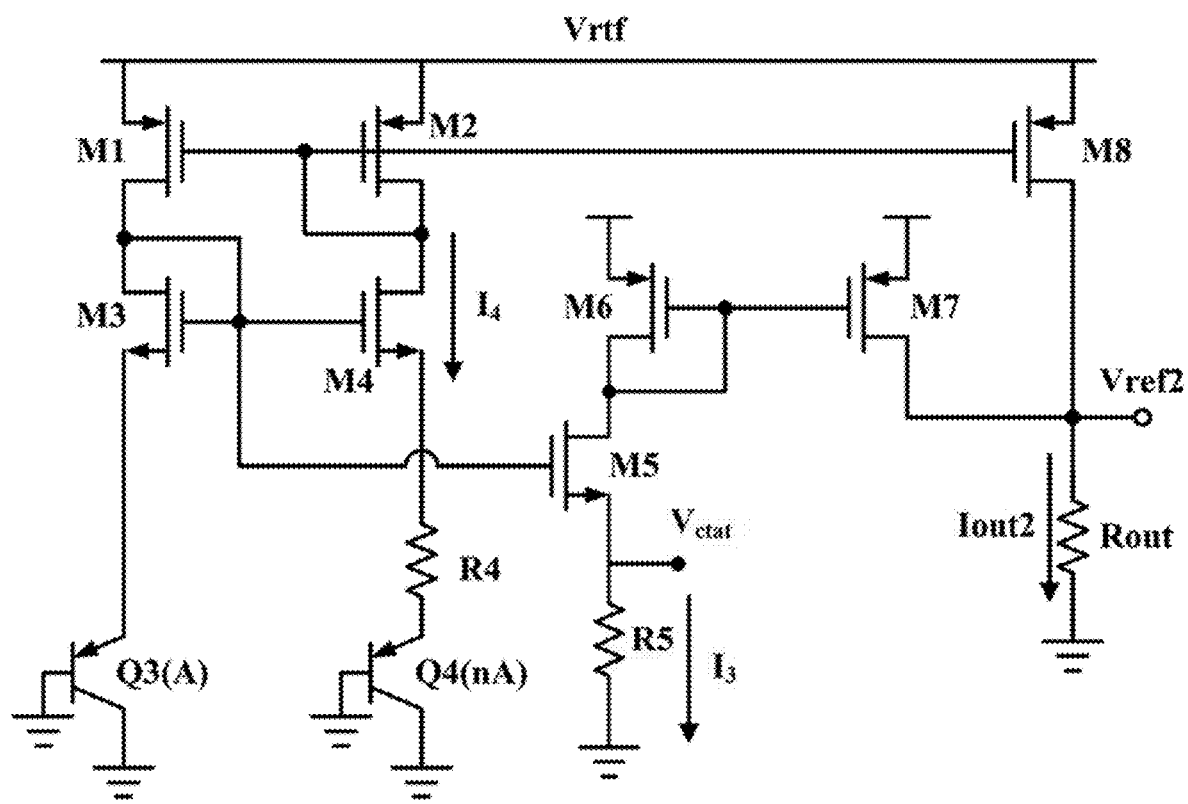
FIG. 13 is an example of circuit illustrating a (N-1) order temperature curvature compensation negative reference voltage circuit in FIG. 11.

Next, as shown in FIG. 13, an example of circuit showing the (N-1) order temperature curvature compensation negative reference voltage circuit 122 in the temperature curvature compensation reference voltage circuit 120 according to the invention is illustrated. A bandgap reference voltage circuit operating all NMOS field effect transistors (M3, M4, M5) in weak inversion region (weak inversion) is provided. As a MOS field effect transistor operates in a weak inversion region and length channel modulation effect is ignored, the relation of drain current is similar to the collector current of a bipolar junction transistor. The area ratio of emitters of bipolar junction transistors Q3 and Q4 is 1:n, the emitter-base voltage difference thereof and a resistor R4 generates a current I4 positively correlated with absolute temperature. In the architecture shown in FIG. 13, the current I3 negatively correlated with absolute temperature is formed of a resistor R5 and the across voltage thereof, which is Veb3+Vgs3−Vgs5. A current Iout2 is formed by adding up the current I3 negatively correlated with absolute temperature and the current I4 positively correlated with absolute temperature. The output reference voltage Vref2 comprises first order temperature term and higher order temperature terms. For first order zero temperature coefficient, the proportion of the references R4 and R5 may be obtained, such that the first order temperature term equals to zero. The output voltage of the architecture shown in FIG. 13 still maintains higher order terms, and is a function of finite curvature, different from the reference voltage curvature illustrated in FIG. 12 mentioned above. The minimum voltage in a given temperature range occurs as the curvature of the architecture in FIG. 13 is zero, so that one function with upward opening with respect to temperature is obtained.

Therefore, from FIGS. 12 and 13, the temperature curvature compensation reference circuit 120 in the voltage regulation unit 12 according to the invention is a bandgap reference circuit with higher order temperature compensation for adding up the reference voltage with upward opening with respect to temperature and the reference voltage with downward opening with respect to temperature under the same condition of reference temperature, and the N order temperature compensation reference voltage Vref for the temperature curvature compensation reference circuit 120 to process is output, achieving a better temperature coefficient in the same temperature range.

Next, refer to FIG. 11 again. The high stability linear voltage regulation circuit 125 shown in FIG. 11, which is characterized by low voltage, high power voltage rejection ratio, low quiescent current, high stability, low area and low cost, and is applicable to an integrated chip, includes an error amplifier 126, a stability enhancer 127, a conduction element 128 and a high impedance feedback network 129. A DC voltage output from the voltage regulation capacitor 115 of the rectification unit 11 will act as the power for the temperature curvature compensation reference voltage circuit 120 and the high stability linear voltage regulation circuit 125. The N order temperature compensation reference voltage Vref processed by the temperature curvature compensation reference circuit 120 and the feedback voltage output from the high impedance feedback network 129 are delivered into the error amplifier 126, and the conduction voltage output for conducting the conduction element 128 is adjusted by the error amplifier 126. The stability enhancer 127 is inserted between the error amplifier 126 and the conduction element 128 to enhance the stability of the entire circuit. An input voltage with ripple is converted into a steady DC voltage for the back end circuit 2 by the conduction element 128. As the output voltage changes with unloading of the back end circuit 2, the output voltage is fed back to the error amplifier 126 and the stability enhancer 127 through the high impedance feedback network 129 to adjust the output voltage, and transferred to the back end circuit 2 via the conduction element 128. Wherein, the error amplifier 126 operates in a low bias current mode and the high impedance feedback network 129 is implemented in a manner of a large impedance as a transistor in a cutoff region to achieve a low quiescent current.

Figure 14:
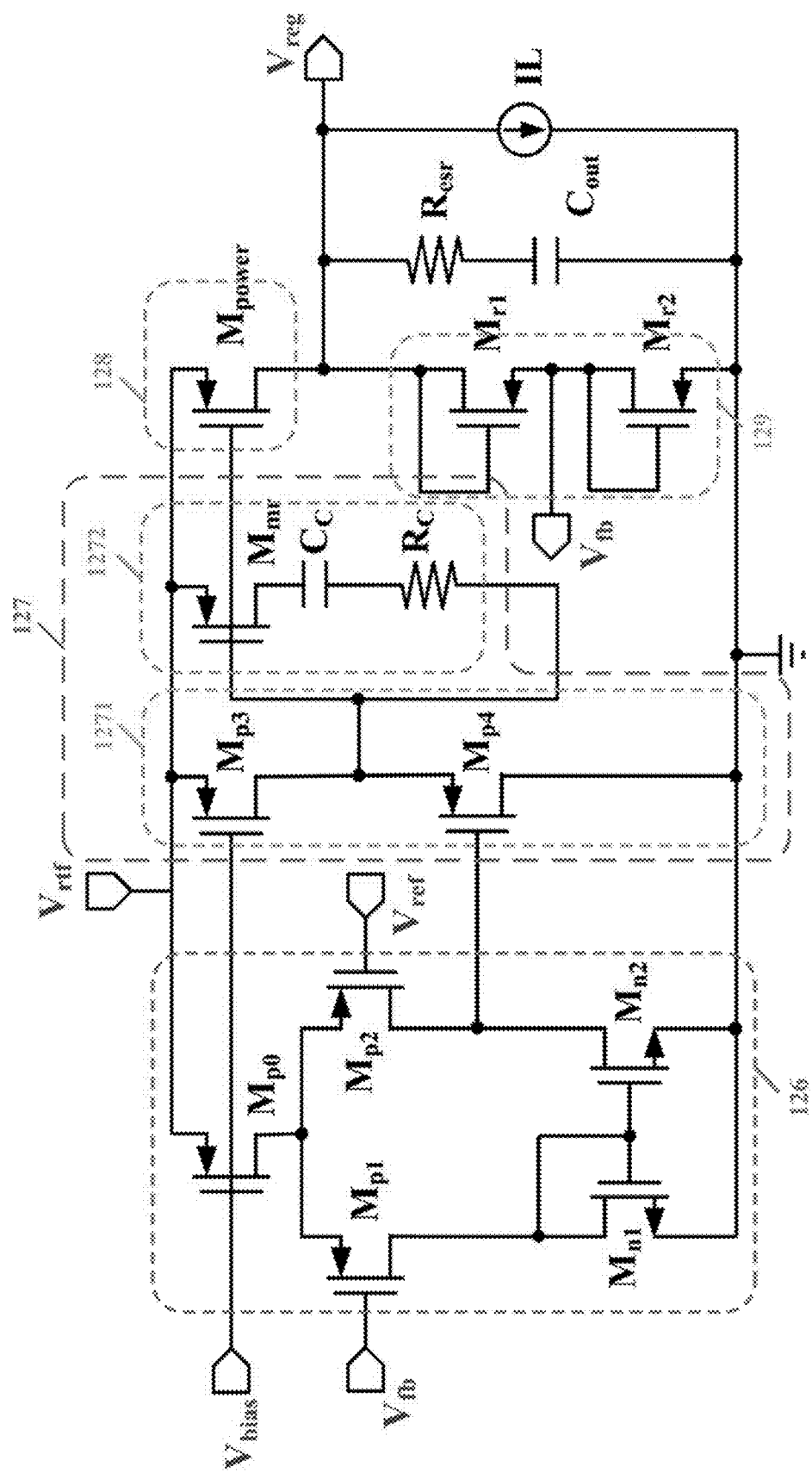
FIG. 14 is an example of circuit illustrating a high stability linear voltage regulation circuit shown in FIG. 11.

As shown in FIG. 14, an example of circuit for the high stability linear voltage regulation circuit 125 shown in FIG. 11 is illustrated. The voltage regulation unit 12 according to the invention is improved with respect to architecture of conventional voltage regulators. As shown in FIG. 14, three additional technologies are added to enhance the stability of conventional voltage regulators and reduce quiescent current, including a voltage buffer 1271, a pole-zero tracker 1272 and a high impedance feedback network 129.

In an integrated biomedical SoC (System on Chip), an output capacitance Cout is expected to be reduced as smaller as possible for saving the area of a printed circuit board (PCB). However, the reduced output capacitance will influence the location of the dominant pole in frequency response. If a non-dominant pole is close to the dominant pole too much, the phase margin of the voltage regulator may be insufficient, and the system is unstable accordingly. A non-dominant pole P2 results from the output impedance of the error amplifier 126 and the parasitic capacitance at the gate end of the conduction element 128. To ensure stabilization of the entire system, one voltage buffer 1271 is added between the error amplifier 126 and the conduction element 128, characterized in that the parasitic capacitance output from the error amplifier 126 is less than the parasitic capacitance at the gate end of the conduction element 128, and the output impedance of the conduction element 128 is less than the output impedance of the error amplifier 126, so that the original non-dominant pole is divided into two higher frequency non-dominant poles. In a circuit design, two non-dominant poles may be pushed outside bandwidth for a more stabilized voltage regulator.

The dominant pole of the high stability linear voltage regulation circuit 125 will change with a load current IL, while the factor of load change is not considered for the voltage buffer 1271, so that an additional pole-zero tracking technology has to be added for enhancing the stability of circuit further. In the design for voltage regulation of the high stability linear voltage regulation circuit 125, not only a condition of heavy load is considered, but also a condition of light load is considered to determine whether the system is stable. The dominant pole and the unity gain frequency will drift toward a lower frequency with decreased load to reduce the response speed of the voltage regulator, so that the pole-zero tracking circuit 1272 is added between the voltage buffer 1271 and the conduction element 128.

The so called pole-zero tracking is used for pole-zero compensation actually. For a voltage regulator with a conventional architecture, one adaptable output capacitance equivalent series resistance is designed to achieve stability. However, this capacitance equivalent series resistance has to be within a certain range. Otherwise, stabilization still cannot be achieved as the range is exceeded. Moreover, the capacitance equivalent series resistance differs depending on temperature environment, operating voltage, operating resistance and fabrication material, so that it is uneasy to choose a capacitance applicable to all conditions. Therefore, the pole-zero tracking adjust zeros through active circuits. That is, the pole-zero tracking circuit 1272 allows the conduction element 128 to be capable of pole-zero compensation with the dominant pole through resistance and capacitance in conjunction with the feedback mechanism of the conduction element 128. The resistance of a resistor Rc is adjusted through the gate voltage of the conduction element 128, and one fixed magnification is formed with the equivalent resistance of the conduction element 128 to achieve the purpose of compensating for the dominant pole. As such, the unity gain frequency is moved toward a higher frequency, the voltage regulator is more stabilized, and the response speed is increased under a stable condition.

In addition, for a biomedical system, it would be better to reduce the power current to a micro-ampere level, in order to avoid unwanted consumption. In a voltage regulator, the quiescent current is mainly divided into two portions. One portion is the power consumption of the error amplifier. This portion may operate the circuit in a weak inversion region (weak inversion) to reduce the DC bias voltage. The other portion is reduction of the current flowing through a feedback resistor. This portion will consume a considerable area if it is implemented directly by increasing passive resistance, and results in inconvenience for the biomedical system which requires miniaturization. Therefore, the high impedance feedback network 129 of the high stability linear voltage regulation circuit 125 according to the invention replaces the feedback resistor in a conventional voltage regulator by using a transistor to implement a pseudo-resistor. As shown in FIG. 14, P type transistors (Mr1, Mr2) operate in cutoff regions to implement large resistance equivalently. The source and the body of the P type transistor are connected, and the gate and the drain thereof are connected to form one field effect transistor in the form of diode. For the transistor Mr2, as the voltage of the source is less than that of the drain, i.e., the voltage of the gate is greater than zero, the transistor Mr2 is operated in a cutoff region. As there is a small across voltage between the drain and the source, a parasitic PNP bipolar junction transistor from the drain to the source through the N-Well will be conducted. The parasitic PNP bipolar junction transistor is also one transistor in the form of diode, and may be equivalent to one large resistor, i.e., a pseudo-resistor. As the output voltage is 1.2 V, its resistance may be approximated to 10 mega-ohms, so that the feedback resistor in the voltage regulator is implemented by utilizing such characteristic for achieving reduction of quiescent current and low power consumption.

Figure 15:
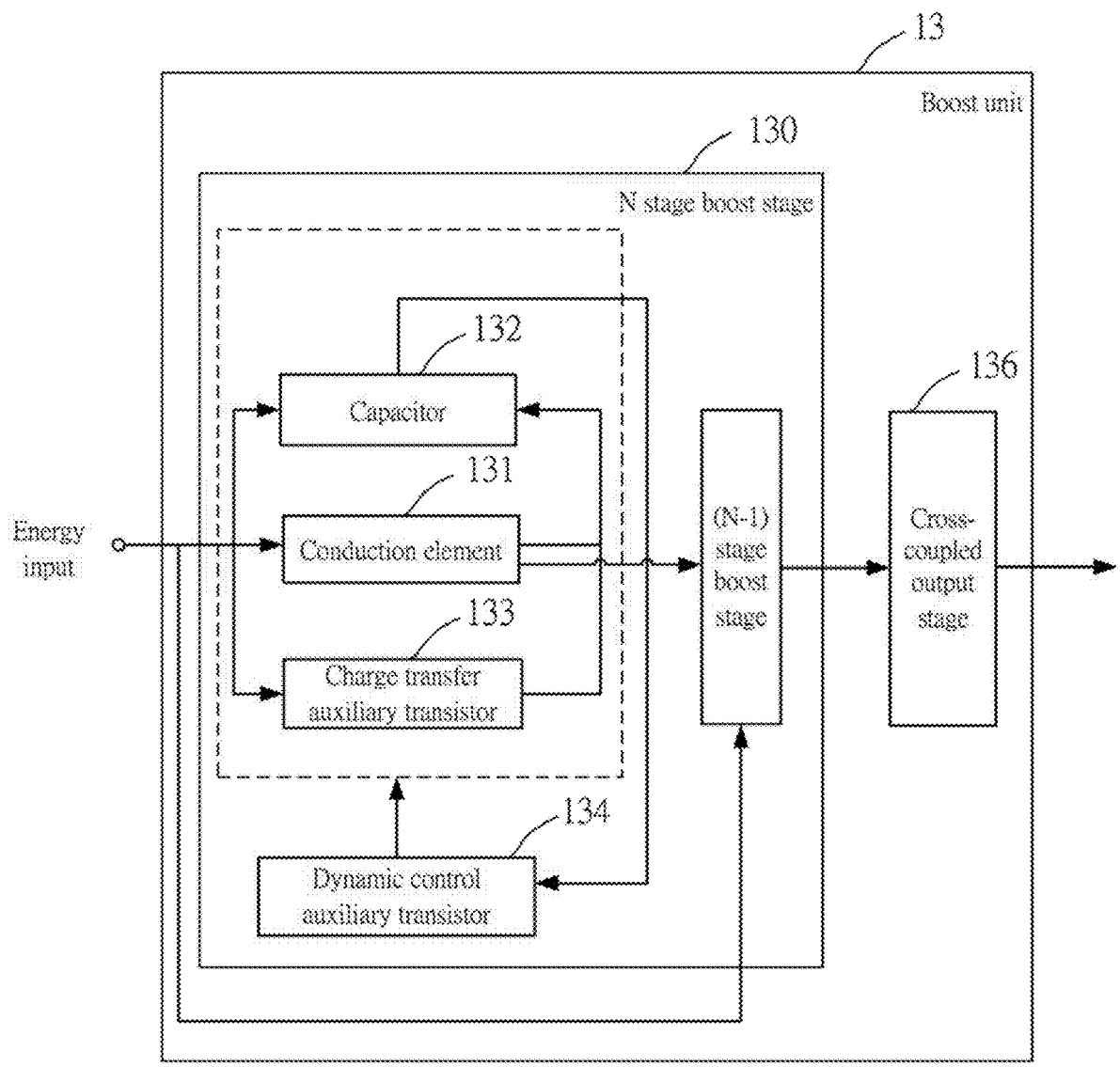
FIG. 15 is a block diagram illustrating a basic architecture for a booster unit of the energy acquisition and power supply system according to the invention shown in FIG. 1.

Next, refer to FIG. 4 mentioned above again, which illustrates application of the energy acquisition and power supply system 1 in accordance with the invention to power supply process for electronic equipments of low DC voltage. If the energy acquisition and power supply system 1 according to the invention is used for rectifying the input energy to a DC voltage higher than the input in order to perform a power supply process for the back end circuit 2, such as a high voltage stimulator of a biomedical system, a power process may be performed through the boost unit 13 and the voltage regulation unit 12 of the energy acquisition and power supply system 1 according to the invention. It should be noted that, in another example, if the energy acquisition and power supply system 1 according to the invention is used for rectifying the input energy to a DC voltage less than the input, in the path of the back end circuit for power supply process, the electrical signal process architectures for the voltage regulation units 12 in two paths for a DC voltage less than the input due to rectification and a high DC voltage are consistent. As shown in FIG. 11, for simplified illustration, the voltage regulation unit 12 is not described again here, but the boost unit 13 is further described below. As shown in FIG. 15, the boost unit 13, which is characterized by high voltage conversion efficiency, includes a boost stage 130 with N stages, and a cross-coupled output stage 136. A voltage is increased via the boost stage 130 with N stages for an input AC energy, and a required high voltage is output through the cross-coupled output stage 136. The boost stage 130 includes a conduction element 131, a capacitor 132, a charge transfer auxiliary transistor 133 and a dynamic control auxiliary transistor 134 therein. The input energy is stored in the capacitor 132 via the conduction element 131. The output voltage is raised by changing a voltage on another end of the capacitor 132. The across voltage of the conduction element 131 is reduced with a high voltage at a back stage by utilizing the charge transfer auxiliary transistor 133 in parallel with the conduction element 131. The charge transfer auxiliary transistor 133 will generate a reverse leakage current path under a transient condition, so that clocks are switched rapidly by utilizing the dynamic control auxiliary transistor 134 for reducing the reverse leakage current of the charge transfer auxiliary transistor 133 to increase energy conversion efficiency, while the cross-coupled output stage 136 is intended to stabilize output and reduce ripple. Finally, a converted power signal with ripple removed is transferred to the voltage regulation unit 12 at a back end, in order for performing the temperature compensation as mentioned above, and converting and transmitting a steady DC voltage to the back end circuit 2.

Figure 16:
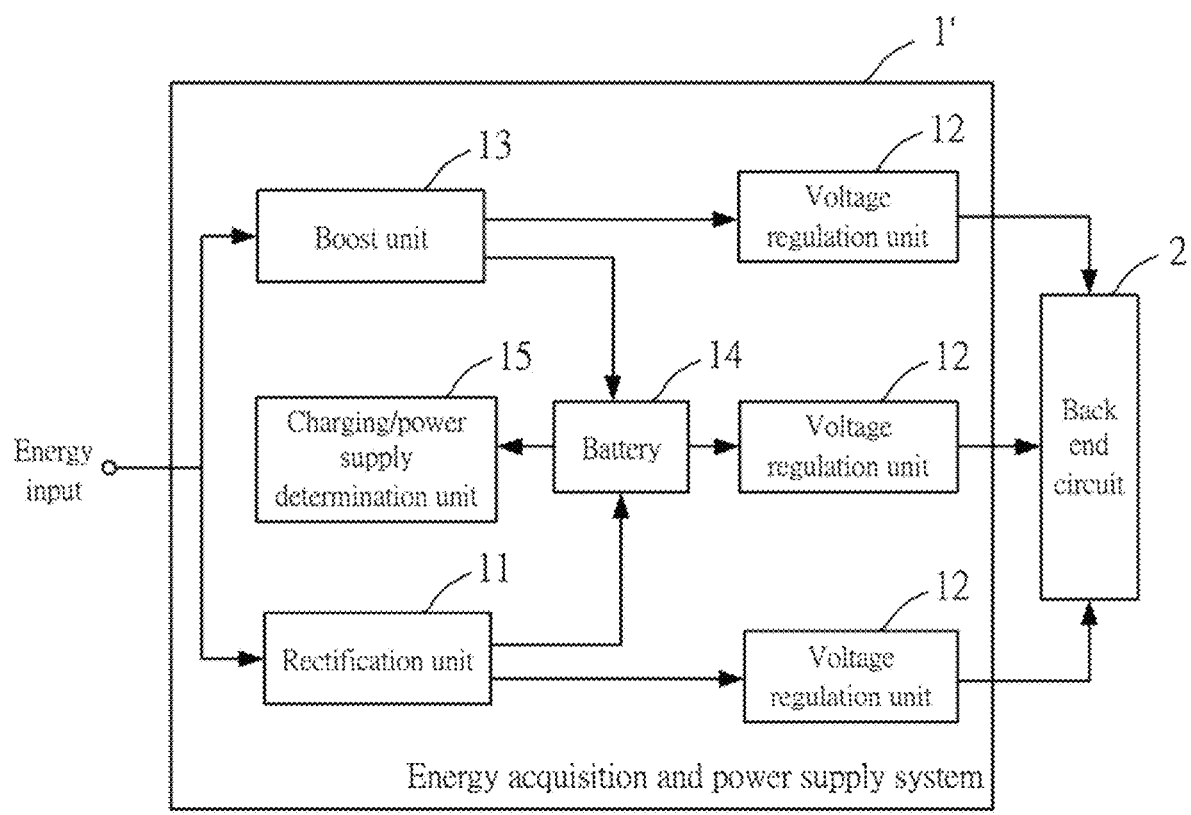
FIG. 16 is a block diagram illustrating a basic architecture for another example of an energy acquisition and power supply system according to the invention.

Furthermore, refer to FIG. 16, which illustrates another example of the energy acquisition and power supply system according to the invention. An energy acquisition and power supply system 1' of this example differs from what illustrated in FIG. 1 above in that the energy acquisition and power supply system 1' further includes a battery 14 and a charging/power supply determination circuit 15. The energy acquisition and power supply system 1 illustrated in FIG. 1 above is used to replace an embedded battery in an energy acquisition and power supply system of a modern wearable device or an IoT product for supplying power with an input energy, such as solar energy, thermal energy, RF energy, AC electrical energy or piezoelectric vibration energy etc., according to the invention, and is applicable to low power consumption or passive products; while the energy acquisition and power supply system 1' of this example has the battery 14, which is applicable to products which require a certain power consumption or do not have energy source for long time. The charging/power supply determination circuit 15 mainly utilizes logic gates and a comparator to perform a charging/power supply determination for the electric quantity of the battery 14, in order to reduce memorability of the battery 14 and maintain normal operation of the back end circuit 2. In a further example, power may be supplied by multiple batteries to switch on the charging switch as the electric quantity of the main battery is lower than a certain level, and the power supply path thereof is opened simultaneously until it is charged to the highest electric quantity. Meanwhile, the power is supplied by a second priority battery.

Rectifiers with existing architectures, like cross-coupled CMOS full-wave bridge rectifiers, gate and drain biased rectifiers, substrate and source biased rectifiers and floating gate rectifiers, have drawbacks of leakage current, so that current conversion efficiency cannot be enhanced; alternatively, additional bias power sources and additional processes are required to achieve high voltage conversion efficiency. Accordingly, area cost is increased, so that they are not applicable to wearable devices and interconnection network applications. Nevertheless, for the rectification unit of the energy acquisition and power supply system according to the invention, the dynamic substrate selection circuit is designed with the deep well structure technology in a CMOS process to reduce leakage current of the substrate generated due to parasitic transistors. Moreover, the reverse leakage current suppression circuit is added for the gate of the main transistor to achieve rapid control signal and suppress reverse leakage current. Further, the adaptive voltage control circuit is added to decrease the voltage difference between the body end and the source of the main transistor. As such, high energy conversion efficiency is achieved. Furthermore, compared to a conventional reference voltage circuit, which only compensates for first order temperature coefficient, the temperature curvature compensation reference voltage circuit in the voltage regulation unit of the energy acquisition and power supply system according to the invention uses a higher order temperature curvature compensation technique to achieve lower temperature coefficient in a large temperature range, and is applicable to an environment of large temperature range, such as automotive electronics. Moreover, the circuit is operated in a low bias current state for reducing power consumption to achieve long term use. In addition, the voltage regulation unit of the energy acquisition and power supply system according to the invention is provided with a pole-zero decomposition & elimination and stability compensation circuit, such that there is a sufficient phase margin in the bandwidth to overcome the stability of low output voltage regulation capacitor. Therefore, compared to linear voltage regulators with other architectures, larger output voltage regulation capacitors are not required to stabilize the system for the same system specifications.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. An energy acquisition and power supply system, including:
    a rectification unit for rectifying an input energy to a DC voltage lower than the input in order to perform a power supply process for a back end circuit, the rectification unit including:
    a plurality of power elements for rectifying a voltage to a DC voltage by switching a conduction path for the input energy, each of the power elements including a transistor capable of conduction path switching, a current regulator having a dynamic substrate selection circuit and a reverse leakage current suppression circuit as well as a voltage regulator having an adaptive voltage control circuit, wherein the dynamic substrate selection circuit selects a substrate potential of the transistor capable of conduction path switching dynamically to reduce a substrate leakage current of the transistor capable of conduction path switching, and the reverse leakage current suppression circuit is utilized for switching the power element at a local end to reduce transient reverse leakage current and current consumption of the power element at the local end for an input voltage, such that an output current for the power element at the local end is maximized; the adaptive voltage control circuit is used to increase a conduction voltage for lowering a conduction resistance, increasing switching speed when the power element at the local end are conducted in order to improve conversion performance;
    a voltage regulation capacitor for outputting the DC voltage rectified by the power element as a DC voltage with low ripple, and
    a first voltage regulation unit for stabilizing and transferring the DC voltage output by the rectification unit to the back end circuit as power supply.

2. The energy acquisition and power supply system according to claim 1, wherein two switch transistors are added on a body end of the transistor capable of conduction path switching for the dynamic substrate selection circuit, the body end of the transistor capable of conduction path switching can conduct one of the two switch transistors in correspondence according to potential levels at a voltage input end and a voltage output end for reducing the substrate leakage current of the transistor capable of conduction path switching.

3. The energy acquisition and power supply system according to claim 1, wherein the dynamic substrate selection circuit utilizes a deep well structure technology in a CMOS process such that potentials of the transistor capable of conduction path switching and the two switch transistors are separated on one semiconductor substrate.

4. The energy acquisition and power supply system according to claim 2, wherein the dynamic substrate selection circuit utilizes a deep well structure technology in a CMOS process such that potentials of the transistor capable of conduction path switching and the two switch transistors are separated on one semiconductor substrate.

5. The energy acquisition and power supply system according to claim 1, wherein the reverse leakage current suppression circuit is composed of one common-gate-type comparator, such that as an output voltage which is output from the transistor capable of conduction path switching is greater than an input voltage, a gate voltage of the transistor capable of conduction path switching is pulled to the potential of the output voltage for the voltage of an output node to be pulled to a ground potential through an output stage rapidly; on the contrary, as an output voltage which is output from the transistor capable of conduction path switching is less than an input voltage, an gate voltage of the transistor capable of conduction path switching is pulled to a ground potential for the voltage of an output node to be pulled to the input voltage through an output stage rapidly, such that the gate of the transistor capable of conduction path switching achieves a rapid conduct signal and suppresses a reverse leakage current.

6. The energy acquisition and power supply system according to claim 1, wherein the first voltage regulation unit includes: a first temperature curvature compensation reference voltage circuit and a first high stability linear voltage regulation circuit, the first temperature curvature compensation reference voltage circuit including: a first (N-1) order temperature curvature compensation positive reference voltage circuit, a first (N-1) order temperature curvature compensation negative reference voltage circuit and a first adder, the first temperature curvature compensation reference circuit performing temperature compensation according to a DC voltage output from the voltage regulation capacitor of the rectification unit, wherein the first (N-1) order temperature curvature compensation positive reference voltage circuit is used for generating a (N-1) order temperature curvature compensation positive reference voltage positively correlated with a temperature, the first (N-1) order temperature curvature compensation negative reference voltage circuit is used for generating a (N-1) order temperature curvature compensation negative reference voltage negatively correlated with a temperature, and the first adder is used for adding up the first (N-1) order temperature curvature compensation positive reference voltage and the first (N-1) order temperature curvature compensation negative reference voltage to output a first temperature compensation reference voltage, in order for being applicable to a large temperature range of N order temperature curvature compensation reference voltage.

7. The energy acquisition and power supply system according to claim 6, wherein the first voltage regulation unit further includes: a first high stability linear voltage regulation circuit, which includes: a first error amplifier, a first stability enhancer, a first conduction element and a first high impedance feedback network, the first error amplifier receives a DC voltage output from a voltage regulation capacitor of the rectification unit, a first temperature compensation reference voltage output from the first temperature curvature compensation reference voltage circuit, and a feedback voltage output from the first high impedance feedback network, as well as adjusts a conduction voltage which is output for conducting the first conduction element, while the first stability enhancer is arranged between the first error amplifier and the first conduction element to enhance the stability of the entire circuit, and a steady DC voltage is converted from the received input voltage by the first conduction element for the back end circuit, wherein as the output DC voltage changes with the back end circuit, the output DC voltage is fed back to the first error amplifier and the first stability enhancer through the first high impedance feedback network for adjusting the output DC voltage, and transferred to the back end circuit via the first conduction element.

8. The energy acquisition and power supply system according to claim 7, wherein the first error amplifier operates in a low bias current mode and the high impedance feedback network is implemented in a manner of a large impedance as a transistor in a cutoff region to achieve a low quiescent current.

9. The energy acquisition and power supply system according to claim 7, wherein the first stability enhancer in the first high stability linear voltage regulation circuit includes: a first voltage buffer and a first pole-zero tracking circuit, in which a parasitic capacitance at an output of the first error amplifier is an input capacitance of the first voltage buffer, wherein the input capacitance is less than a parasitic capacitance at an gate end of the first conduction element, and an input impedance of the first conduction element is an output impedance of the first conduction element, wherein the input impedance is less than an output impedance of the first error amplifier, such that an original non-dominant pole is divided into two higher frequency non-dominant poles; the first pole-zero tracking circuit allows the first conduction element to be capable of performing pole-zero compensation with a dominant pole through resistor and capacitor in conjunction with a feedback mechanism of the first conduction element, adjusts the resistance of a resistor in connection with the first conduction element, and forms a fixed magnification with an equivalent resistance of the first conduction element to achieve compensation of dominant pole, whereby a unity gain frequency moves toward a high frequency for more stable voltage regulation process, and for increase of response speed under a stable condition.

10. The energy acquisition and power supply system according to claim 8, wherein the first stability enhancer in the first high stability linear voltage regulation circuit includes: a first voltage buffer and a first pole-zero tracking circuit, in which a parasitic capacitance at an output of the first error amplifier is an input capacitance of the first voltage buffer, wherein the input capacitance is less than a parasitic capacitance at an gate end of the first conduction element, and an input impedance of the first conduction element is an output impedance of the first conduction element, wherein the input impedance is less than an output impedance of the first error amplifier, such that an original non-dominant pole is divided into two higher frequency non-dominant poles; the first pole-zero tracking circuit allows the first conduction element to be capable of performing pole-zero compensation with a dominant pole through resistor and capacitor in conjunction with a feedback mechanism of the first conduction element, adjusts the resistance of a resistor in connection with the first conduction element, and forms a fixed magnification with an equivalent resistance of the first conduction element to achieve compensation of dominant pole, whereby a unity gain frequency moves toward a high frequency for more stable voltage regulation process, and for increase of response speed under a stable condition.

11. The energy acquisition and power supply system according to claim 1, further including at least a power supply battery and a charging/power supply determination unit, which is used for the at least a power supply battery to store a rectified DC voltage flowed from the rectification unit, for controlling the at least a power supply battery to supply a power stored therein to the back end circuit.

12. The energy acquisition and power supply system according to claim 11, wherein a power supply path between the at least a power supply battery and the back end circuit is provided with a second voltage regulation unit, which further includes: a second high stability linear voltage regulation circuit, which includes: a second error amplifier, a second stability enhancer, a second conduction element and a second high impedance feedback network, the second error amplifier receives a DC voltage output from a voltage regulation capacitor of the rectification unit, a second temperature compensation reference voltage output from the second temperature curvature compensation reference voltage circuit, and a feedback voltage output from the second high impedance feedback network, as well as adjusts a conduction voltage which is output for conducting the second conduction element, while the second stability enhancer is arranged between the second error amplifier and the second conduction element to enhance the stability of the entire circuit, and a steady DC voltage is converted from the received input voltage by the second conduction element for the back end circuit, wherein as the output DC voltage changes with the back end circuit, the output DC voltage is fed back to the second error amplifier and the second stability enhancer through the second high impedance feedback network for adjusting the output DC voltage, and transferred to the back end circuit via the second conduction element.

13. The energy acquisition and power supply system according to claim 12, wherein the second stability enhancer in the second high stability linear voltage regulation circuit includes: a second voltage buffer and a second pole-zero tracking circuit, in which a parasitic capacitance at an output of the second error amplifier is an input capacitance of the second voltage buffer, wherein the input capacitance is less than a parasitic capacitance at an gate end of the second conduction element, and an input impedance of the second conduction element is an output impedance of the second conduction element, wherein the input impedance is less than an output impedance of the second error amplifier, such that an original non-dominant pole is divided into two higher frequency non-dominant poles; the second pole-zero tracking circuit allows the second conduction element to be capable of performing pole-zero compensation with a dominant pole through resistor and capacitor in conjunction with a feedback mechanism of the second conduction element, adjusts the resistance of a resistor in connection with the second conduction element, and forms a fixed magnification with an equivalent resistance of the second conduction element to achieve compensation of dominant pole, whereby a unity gain frequency moves toward a high frequency for more stable voltage regulation process, and for increase of response speed under a stable condition.

14. The energy acquisition and power supply system according to claim 1, further including a boost unit, which is used for rectifying the input energy to a DC voltage higher than an input in order to perform the power supply process for another back end circuit.

15. The energy acquisition and power supply system according to claim 14, wherein a power supply path from the boost unit to the another back end circuit is provided with a third voltage regulation unit, which further includes: a third high stability linear voltage regulation circuit, which includes: a third error amplifier, a third stability enhancer, a third conduction element and a third high impedance feedback network, the third error amplifier receives a DC voltage output from a voltage regulation capacitor of the rectification unit, a third temperature compensation reference voltage output from the third temperature curvature compensation reference voltage circuit, and a feedback voltage output from the third high impedance feedback network, as well as adjusts a conduction voltage which is output for conducting the third conduction element, while the third stability enhancer is arranged between the third error amplifier and the third conduction element to enhance the stability of the entire circuit, and a steady DC voltage is converted from the received input voltage by the third conduction element for the another back end circuit, wherein as the output DC voltage changes with the back end circuit, the output DC voltage is fed back to the third error amplifier and the third stability enhancer through the third high impedance feedback network for adjusting the output DC voltage, and transferred to the another back end circuit via the third conduction element.

16. The energy acquisition and power supply system according to claim 15, wherein the third stability enhancer in the third high stability linear voltage regulation circuit includes: a third voltage buffer and a third pole-zero tracking circuit, in which a parasitic capacitance at an output of the third error amplifier is an input capacitance of the third voltage buffer, wherein the input capacitance is less than a parasitic capacitance at an gate end of the third conduction element, and an input impedance of the third conduction element is an output impedance of the third conduction element, wherein the input impedance is less than an output impedance of the third error amplifier, such that an original non-dominant pole is divided into two higher frequency non-dominant poles; the third pole-zero tracking circuit allows the third conduction element to be capable of performing pole-zero compensation with a dominant pole through resistor and capacitor in conjunction with a feedback mechanism of the third conduction element, adjusts the resistance of a resistor in connection with the third conduction element, and forms a fixed magnification with an equivalent resistance of the third conduction element to achieve compensation of dominant pole, whereby a unity gain frequency moves toward a high frequency for more stable voltage regulation process, and for increase of response speed under a stable condition.

17. A voltage regulation unit for an energy acquisition and power supply system used to perform voltage regulation process for a DC voltage supplied to a back end circuit, the voltage regulation unit including:
a temperature curvature compensation reference voltage circuit including: a (N-1) order temperature curvature compensation positive reference voltage circuit, a (N-1) order temperature curvature compensation negative reference voltage circuit and an adder, the temperature curvature compensation reference circuit performing temperature compensation according to the DC voltage, wherein the (N-1) order temperature curvature compensation positive reference voltage circuit is used for generating a (N-1) order temperature curvature compensation positive reference voltage positively correlated with a temperature, the (N-1) order temperature curvature compensation negative reference voltage circuit is used for generating a (N-1) order temperature curvature compensation negative reference voltage negatively correlated with a temperature, and the adder is used for adding up the (N-1) order temperature curvature compensation positive reference voltage and the (N-1) order temperature curvature compensation negative reference voltage to output a temperature compensation reference voltage, in order for being applicable to a large temperature range of N order temperature curvature compensation reference voltage; and
a high stability linear voltage regulation circuit, which includes: an error amplifier, a stability enhancer, a conduction element and a high impedance feedback network, the error amplifier receives a DC voltage, a temperature compensation reference voltage output from the temperature curvature compensation reference voltage circuit, and a feedback voltage output from the high impedance feedback network, as well as adjusts a conduction voltage which is output for conducting the conduction element, while the stability enhancer is arranged between the error amplifier and the conduction element to enhance the stability of the entire circuit, and a steady DC voltage is converted from the received input voltage by the conduction element for the back end circuit, wherein as the output DC voltage changes with the back end circuit, the output DC voltage is fed back to the error amplifier and the stability enhancer through the high impedance feedback network for adjusting the output DC voltage, and transferred to the back end circuit via the conduction element.

18. The voltage regulation unit according to claim 17, wherein the error amplifier operates in a low bias current mode and the high impedance feedback network is implemented in a manner of a large impedance as a transistor in a cutoff region to achieve a low quiescent current.

19. The voltage regulation unit according to claim 17, wherein the stability enhancer includes: a voltage buffer and a pole-zero tracking circuit, in which a parasitic capacitance at an output of the error amplifier is an input capacitance of the voltage buffer, wherein the input capacitance is less than a parasitic capacitance at an gate end of the conduction element, and an input impedance of the conduction element is an output impedance of the conduction element, wherein the input impedance is less than an output impedance of the error amplifier, such that an original non-dominant pole is divided into two higher frequency non-dominant poles; the pole-zero tracking circuit allows the conduction element to be capable of performing pole-zero compensation with a dominant pole through resistor and capacitor in conjunction with a feedback mechanism of the conduction element, adjusts the resistance of a resistor in connection with the conduction element, and forms a fixed magnification with an equivalent resistance of the conduction element to achieve compensation of dominant pole, whereby a unity gain frequency moves toward a high frequency for more stable voltage regulation process, and for increase of response speed under a stable condition.

* * * * *